United States Patent
Tervo et al.

(10) Patent No.: US 10,353,202 B2
(45) Date of Patent: Jul. 16, 2019

(54) WRAPPED WAVEGUIDE WITH LARGE FIELD OF VIEW

(71) Applicant: Microsoft Technology Licensing, LLC, Redmond, WA (US)

(72) Inventors: Jani Tervo, Espoo (FI); Tuomas Vallius, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/177,749

(22) Filed: Jun. 9, 2016

(65) Prior Publication Data

US 2017/0357089 A1 Dec. 14, 2017

(51) Int. Cl.
*G02B 27/01* (2006.01)
*F21V 8/00* (2006.01)

(52) U.S. Cl.
CPC ......... *G02B 27/0172* (2013.01); *G02B 6/005* (2013.01); *G02B 6/0026* (2013.01); *G02B 6/0076* (2013.01); *G02B 6/0078* (2013.01); *G02B 27/017* (2013.01); *G02B 2027/013* (2013.01); *G02B 2027/0112* (2013.01); *G02B 2027/0125* (2013.01)

(58) Field of Classification Search
CPC .... G02B 2027/0123; G02B 2027/0125; G02B 27/0172; G02B 27/017; G02B 6/0026; G02B 6/005; G02B 6/0076; G02B 6/0078; G02B 6/29329
USPC ........ 359/13, 15, 566, 630, 567; 385/15, 31, 385/37; 345/7, 9
See application file for complete search history.

(56) References Cited

U.S. PATENT DOCUMENTS

| 4,830,464 | A | 5/1989 | Cheysson et al. |
| 5,124,821 | A | 6/1992 | Antler et al. |
| 5,134,521 | A | 7/1992 | Lacroix et al. |
| 6,222,677 | B1 | 4/2001 | Budd et al. |
| 6,529,331 | B2 * | 3/2003 | Massof ............... G02B 27/017 345/9 |
| 6,563,648 | B2 * | 5/2003 | Gleckman .......... G02B 27/0172 359/630 |

(Continued)

FOREIGN PATENT DOCUMENTS

EP 2842003 A1 3/2015

OTHER PUBLICATIONS

Nojima, et al., "The Peripheral Display for Augmented Reality of Self-motion", In Proceedings of 17th International Conference on Artificial Reality and Telexistence, Nov. 28, 2007, pp. 308-309.

(Continued)

*Primary Examiner* — Collin X Beatty
(74) *Attorney, Agent, or Firm* — Arent Fox LLP

(57) ABSTRACT

An apparatus having optical waveguides for providing a large FOV is disclosed. A first light engine projects light into an input diffractive coupler of a first waveguide at a first central angle. An output coupler of the first waveguide projects the light out of the first optical waveguide. A second light engine projects light into an input diffractive coupler of a second waveguide at a second central angle that is greater than the first central angle. An output coupler of the second waveguide projects the light out of the second optical waveguide to intersect with the light projected out of the first optical waveguide. The first waveguide may be used to project a first part of an image into a central portion of a user's vision. The second waveguide may be used to project a second part of the image into a peripheral portion of the user's vision.

22 Claims, 12 Drawing Sheets

(56) References Cited

U.S. PATENT DOCUMENTS

| | | | |
|---|---|---|---|
| 7,119,965 B1 | 10/2006 | Rolland et al. | |
| 7,206,107 B2* | 4/2007 | Levola | G02B 27/0081 359/15 |
| 7,483,604 B2* | 1/2009 | Levola | G02B 5/1842 359/566 |
| 7,724,442 B2* | 5/2010 | Amitai | G02B 6/0056 359/630 |
| 7,764,413 B2* | 7/2010 | Levola | G02B 27/4205 359/13 |
| 7,876,489 B2* | 1/2011 | Gandhi | G02B 6/0035 359/242 |
| 8,160,411 B2* | 4/2012 | Levola | G02B 27/0081 359/466 |
| 8,169,704 B2* | 5/2012 | Saito | G02B 5/1876 359/569 |
| 8,233,204 B1* | 7/2012 | Robbins | G02B 5/1828 345/7 |
| 8,314,993 B2* | 11/2012 | Levola | G02B 6/0016 359/569 |
| 8,320,032 B2* | 11/2012 | Levola | G02B 5/1814 359/13 |
| 8,411,365 B2* | 4/2013 | Saito | H04N 5/2254 348/115 |
| 8,466,953 B2* | 6/2013 | Levola | G02B 27/0081 348/51 |
| 8,472,119 B1* | 6/2013 | Kelly | G02B 5/30 345/8 |
| 8,547,638 B2* | 10/2013 | Levola | G02B 27/0081 359/567 |
| 8,593,734 B2* | 11/2013 | Laakkonen | G02B 6/12007 359/13 |
| 8,654,420 B2* | 2/2014 | Simmonds | G02B 5/0833 359/13 |
| 8,736,963 B2* | 5/2014 | Robbins | G02B 27/144 359/629 |
| 8,749,890 B1* | 6/2014 | Wood | G02B 27/0149 359/632 |
| 8,773,599 B2* | 7/2014 | Saeedi | G02B 5/30 349/11 |
| 8,885,254 B2* | 11/2014 | Saito | G02B 5/1823 359/571 |
| 8,903,207 B1* | 12/2014 | Brown | G02B 27/0103 359/1 |
| 8,913,324 B2* | 12/2014 | Schrader | G02B 27/0172 359/630 |
| 8,917,453 B2 | 12/2014 | Bohn | |
| 8,934,171 B2* | 1/2015 | Desserouer | G02B 5/1861 359/566 |
| 8,947,783 B2* | 2/2015 | Gupta | G02B 27/1086 359/630 |
| 8,989,535 B2* | 3/2015 | Robbins | G02B 5/30 345/7 |
| 9,097,890 B2* | 8/2015 | Miller | G02B 27/0093 |
| 9,124,066 B2* | 9/2015 | Sridharan | H01S 3/10007 |
| 9,244,277 B2* | 1/2016 | Cheng | G02B 27/0172 |
| 9,454,010 B1* | 9/2016 | Passmore | G02B 3/0087 |
| 9,494,799 B2* | 11/2016 | Robbins | G06F 3/013 |
| 9,740,013 B2* | 8/2017 | Amitai | H04N 13/344 |
| 10,127,727 B1* | 11/2018 | Yuan | G06T 19/006 |
| 2002/0181115 A1* | 12/2002 | Massof | G02B 27/017 359/630 |
| 2004/0070839 A1 | 4/2004 | Yagi et al. | |
| 2006/0132914 A1 | 6/2006 | Weiss et al. | |
| 2007/0188837 A1* | 8/2007 | Shimizu | G02B 5/203 359/13 |
| 2009/0067057 A1* | 3/2009 | Sprague | G02B 27/0101 359/630 |
| 2009/0303599 A1* | 12/2009 | Levola | G02B 27/0081 359/567 |
| 2010/0246003 A1* | 9/2010 | Simmonds | G02B 27/0081 359/567 |
| 2010/0296163 A1* | 11/2010 | Saarikko | G02B 5/1814 359/567 |
| 2011/0213664 A1 | 9/2011 | Osterhout et al. | |
| 2012/0162549 A1 | 6/2012 | Gao et al. | |
| 2012/0300311 A1 | 11/2012 | Simmonds et al. | |
| 2013/0051730 A1 | 2/2013 | Travers et al. | |
| 2013/0250430 A1* | 9/2013 | Robbins | G02B 27/0172 359/633 |
| 2014/0002629 A1 | 1/2014 | Ratcliff et al. | |
| 2014/0071539 A1 | 3/2014 | Gao | |
| 2014/0104665 A1 | 4/2014 | Popovich et al. | |
| 2014/0140653 A1* | 5/2014 | Brown | G02B 6/0033 385/10 |
| 2014/0146394 A1 | 5/2014 | Tout et al. | |
| 2014/0168260 A1* | 6/2014 | O'Brien | G09G 5/377 345/633 |
| 2014/0176528 A1 | 6/2014 | Robbins | |
| 2014/0240842 A1* | 8/2014 | Nguyen | G02B 6/0076 359/630 |
| 2014/0293434 A1 | 10/2014 | Cheng et al. | |
| 2014/0300966 A1* | 10/2014 | Travers | G02B 27/4205 359/558 |
| 2014/0375790 A1 | 12/2014 | Robbins et al. | |
| 2015/0062707 A1 | 3/2015 | Simmonds et al. | |
| 2015/0125109 A1* | 5/2015 | Robbins | G02B 27/4205 385/10 |
| 2015/0219842 A1* | 8/2015 | Sqalli | G02B 6/34 385/37 |
| 2015/0260994 A1* | 9/2015 | Akutsu | G02B 6/34 359/567 |
| 2015/0277116 A1* | 10/2015 | Richards | G02B 27/0103 359/13 |
| 2016/0004077 A1* | 1/2016 | Yanagisawa | B60K 35/00 359/633 |
| 2017/0176755 A1* | 6/2017 | Cai | G02B 27/0172 |
| 2017/0287447 A1* | 10/2017 | Barry | G09G 5/391 |
| 2018/0210198 A1* | 7/2018 | Brown | G02B 27/0101 |
| 2018/0210202 A1* | 7/2018 | Danziger | G02F 1/295 |

OTHER PUBLICATIONS

Lanman, et al., "Near-Eye Light Field Displays", In Proceedings of International Conference on Computer Graphics and Interactive Techniques, Jul. 21, 2013, 10 pages.
Benko, et al., "FoveAR: Combining an optical see-through near-eye display with spatial augmented reality projections", In Proceedings of ACM Symposium on User Interface Software and Technology, Nov. 8, 2015, 7 pages.
Van, Duc Nguyen, et al., "Subjective Image Quality Assessment of a Wide-view Head Mounted Projective Display with a Semi-transparent Retro-reflective Screen," The 21st International Conference on Artificial Reality and Telexistence, Nov. 29-30, 2011, 6 pages.
Rolland, Jannick P., "Wide-angle, off-axis, see-through head-mounted display," Society of Photo-Optical Instrumentation Engineers, vol. 39, No. 7, Jul. 2000, 8 pages.
"International Search Report and Written Opinion Issued in PCT Application No. PCT/US2017/034905", dated Aug. 16, 2017, 10 Pages.
Lang, Ben, "This is What it Looks Like Through Vuzix's New Augmented Reality Glasses", Retrieved from: <<http://www.roadtovr.com/vuzix-smart-glasses-augmented-reality-glassesi>>, Oct. 14, 2012, 7 Pages.
Nagahara, et al., "Super Wide Field of View Head Mounted Display Using Catadioptrical Optics", In Journal of Presence: Teleoperators and Virtual Environments, vol. 15, Issue 5, Oct. 2006, 2 pages.
Howlett, Eric, "A Wide Field of View High Resolution Compact Virtual Reality Display", In Proceedings of SID Symposium Digest, May 19, 1992, 17 Pages.

* cited by examiner (top view)

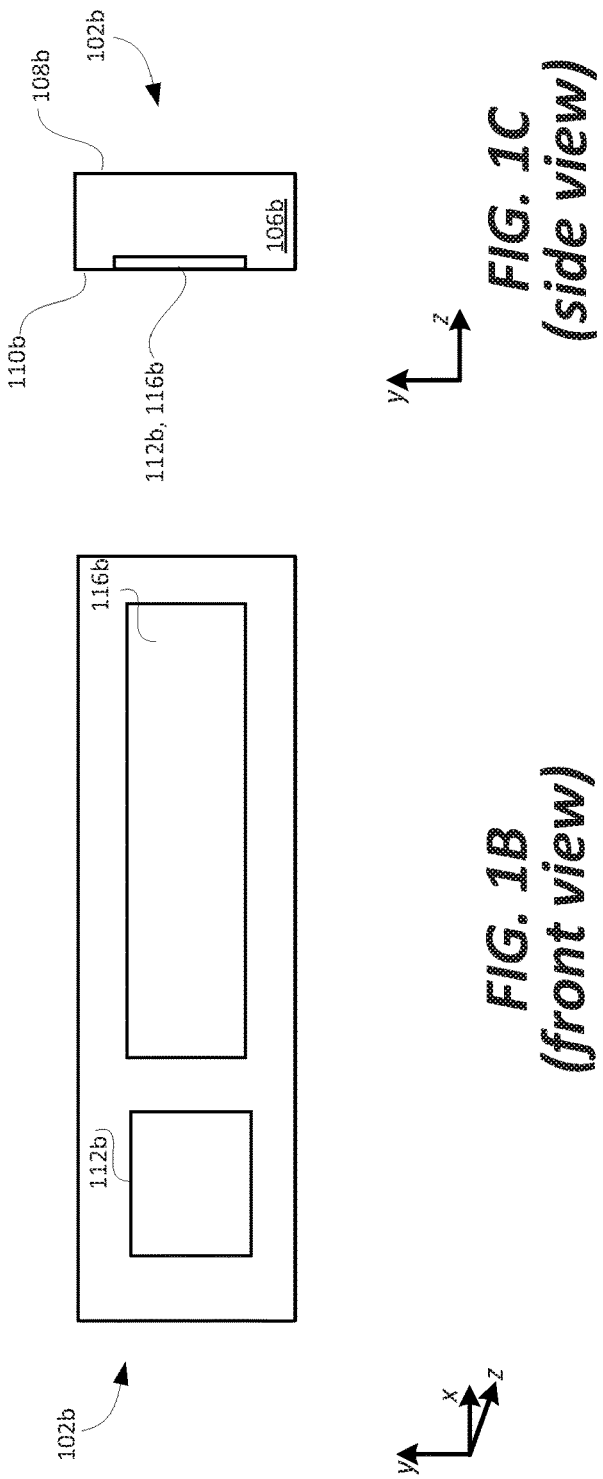

(top view)

(side view)

(front view)

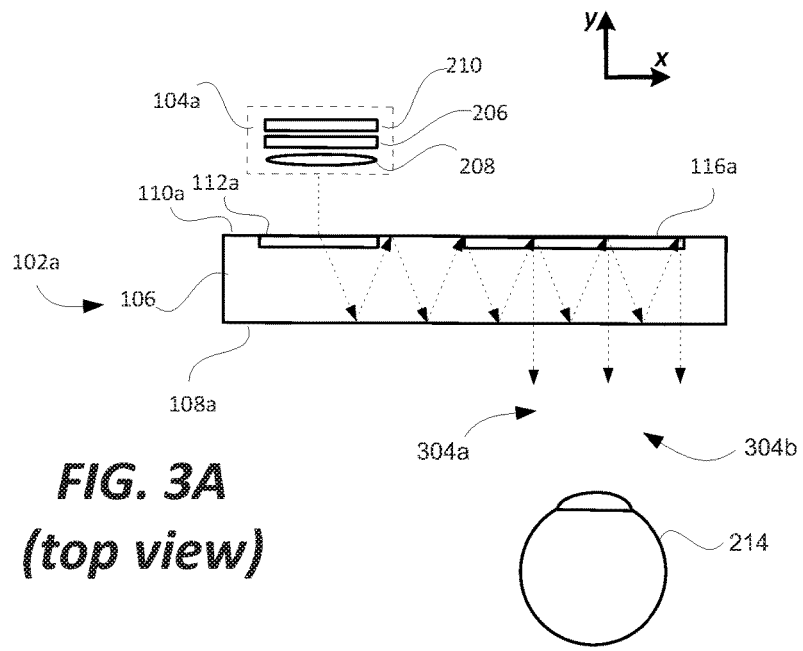
FIG. 3A
*(top view)*
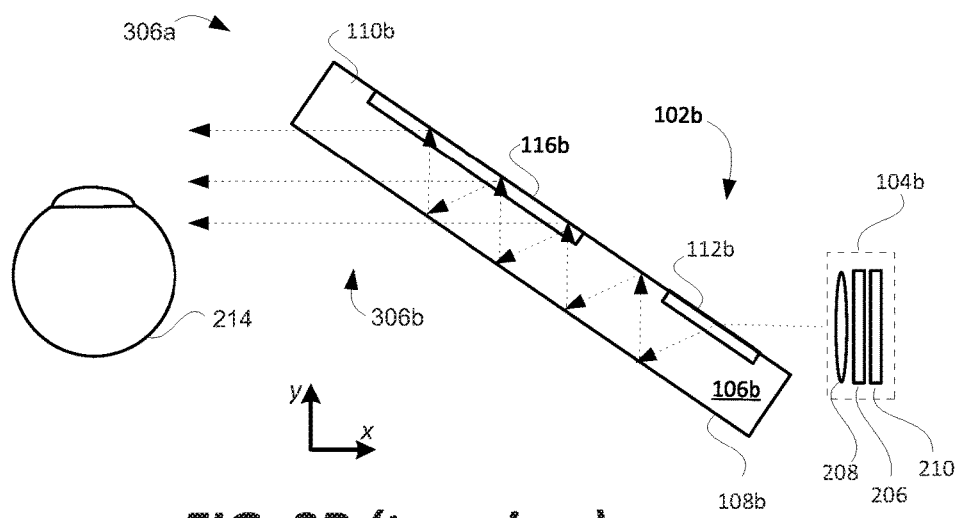
FIG. 3B (top view)

FIG. 5 (top view)

(top view)

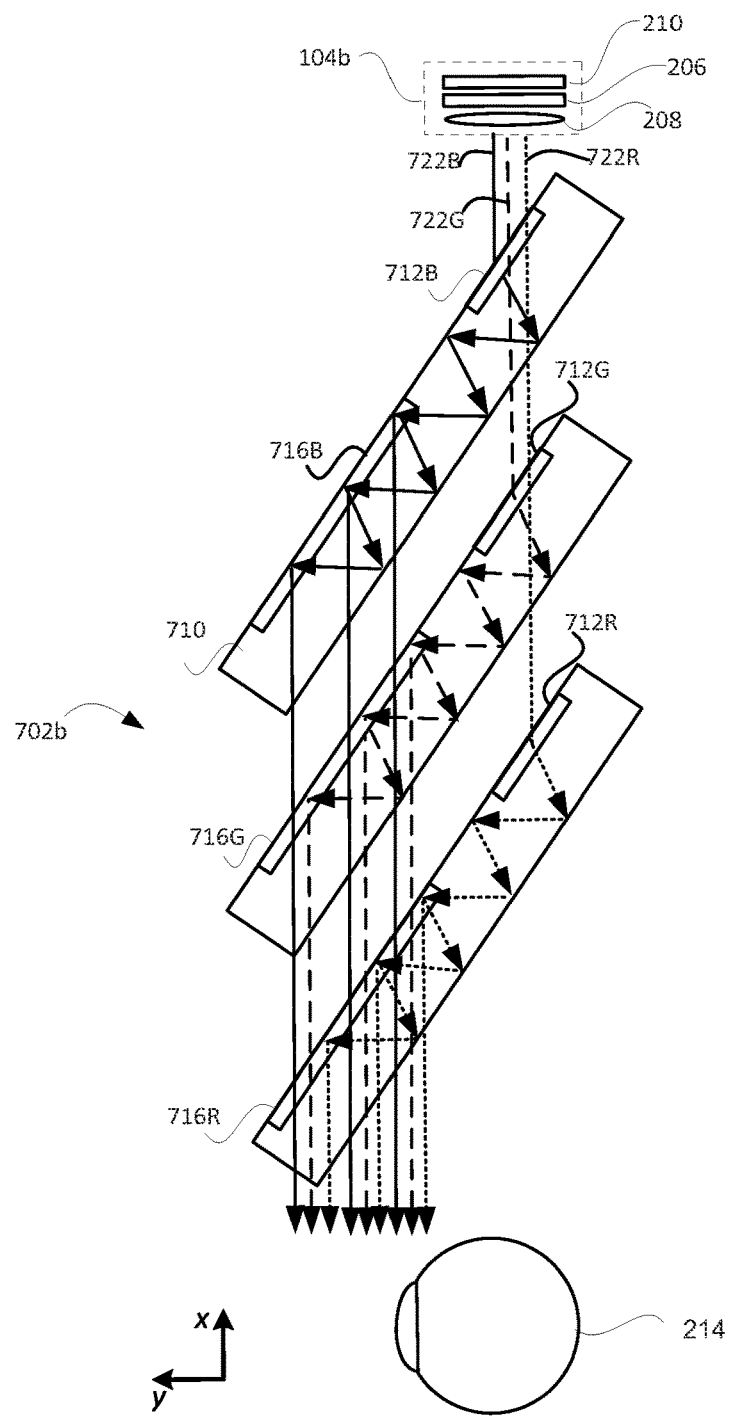
FIG. 7B (top view)

*(top view)*

*(side view)*

WRAPPED WAVEGUIDE WITH LARGE FIELD OF VIEW

BACKGROUND

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment. These devices, which can be implemented as head-mounted display (HMD) glasses or other wearable display devices, but are not limited thereto, often utilize optical waveguides to replicate an image, e.g., produced by a display engine, to a location where a user of a device can view the image as a virtual image in an augmented reality environment. As this is still an emerging technology, there are certain challenges associated with utilizing optical waveguides to display images of virtual objects to a user.

In HMDs and other types of imaging devices that utilize optical waveguides, such as heads up displays (HUDs), light propagates through the optical waveguide only over a limited range of internal angles. Light propagating parallel to the surface will, by definition, travel along the waveguide without bouncing. Light not propagating parallel to the surface will travel along the waveguide bouncing back and forth between the surfaces, so long as the angle of incidence with respect to the surface normal is greater than some critical angle associated with the material from which the optical waveguide is made. For example, for BK-7 glass, this critical angle is about 42 degrees. This critical can be lowered slightly by using a reflective coating, or by using a material having a higher index of refraction, which is typically more expensive. Regardless, the range of internal angles over which light will propagate through an optical waveguide does not vary very much, and for glass, the maximum range of internal angles is typically below 50 degrees. This typically results in a range of angles exiting the waveguide (i.e., angles in air) of less than 40 degrees, and typically even less when other design factors are taken into account.

SUMMARY

Certain embodiments of the present technology relate to an apparatus for increasing the field of view (FOV) of an optical waveguide assembly that comprises two or more optical waveguides.

One embodiment includes an apparatus that comprises a first optical waveguide, a second optical waveguide, a first light engine, and a second light engine. The first optical waveguide has a first input diffractive coupler and a first output coupler. The second optical waveguide has a second input diffractive coupler and a second output coupler. The first light engine is configured to project light into the first input diffractive coupler at a first central angle of incidence. The first output coupler is configured to project the light projected into the first input diffractive coupler out of the first optical waveguide. The second light engine is configured to project light into the second input diffractive coupler at a second central angle of incidence that is greater than the first central angle of incidence. The second output coupler is configured to project the light projected into the second input diffractive coupler out of the second optical waveguide to intersect with light projected out of the first optical waveguide.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1B is a front view of one embodiment of the peripheral optical waveguide 102b of FIG. 1A.

FIG. 1C is a side view of one embodiment of the peripheral optical waveguide 102b of FIG. 1A.

FIG. 3A shows a top view of the main waveguide, and also shows a main display engine that generates an image including angular content that is coupled into the main waveguide by the input-coupler.

FIG. 3B shows a top view of the peripheral waveguide of FIG. 1A, and also shows a peripheral display engine 14b that generates an image including angular content that is coupled into the peripheral waveguide 102b.

FIG. 7B is a diagram showing further details of one embodiment in which the peripheral waveguide comprises a stack of waveguides.

DETAILED DESCRIPTION

Certain embodiments of the present technology can be used to increase the FOV of an optical waveguide assembly that comprises two or more optical waveguides. The two or more optical waveguides may have a wrapped configuration that allows one waveguide to provide a first portion of an image to a central part of a user's vision, and another waveguide to provide a second portion of the image to a peripheral part of the user's vision.

Figure 1A:
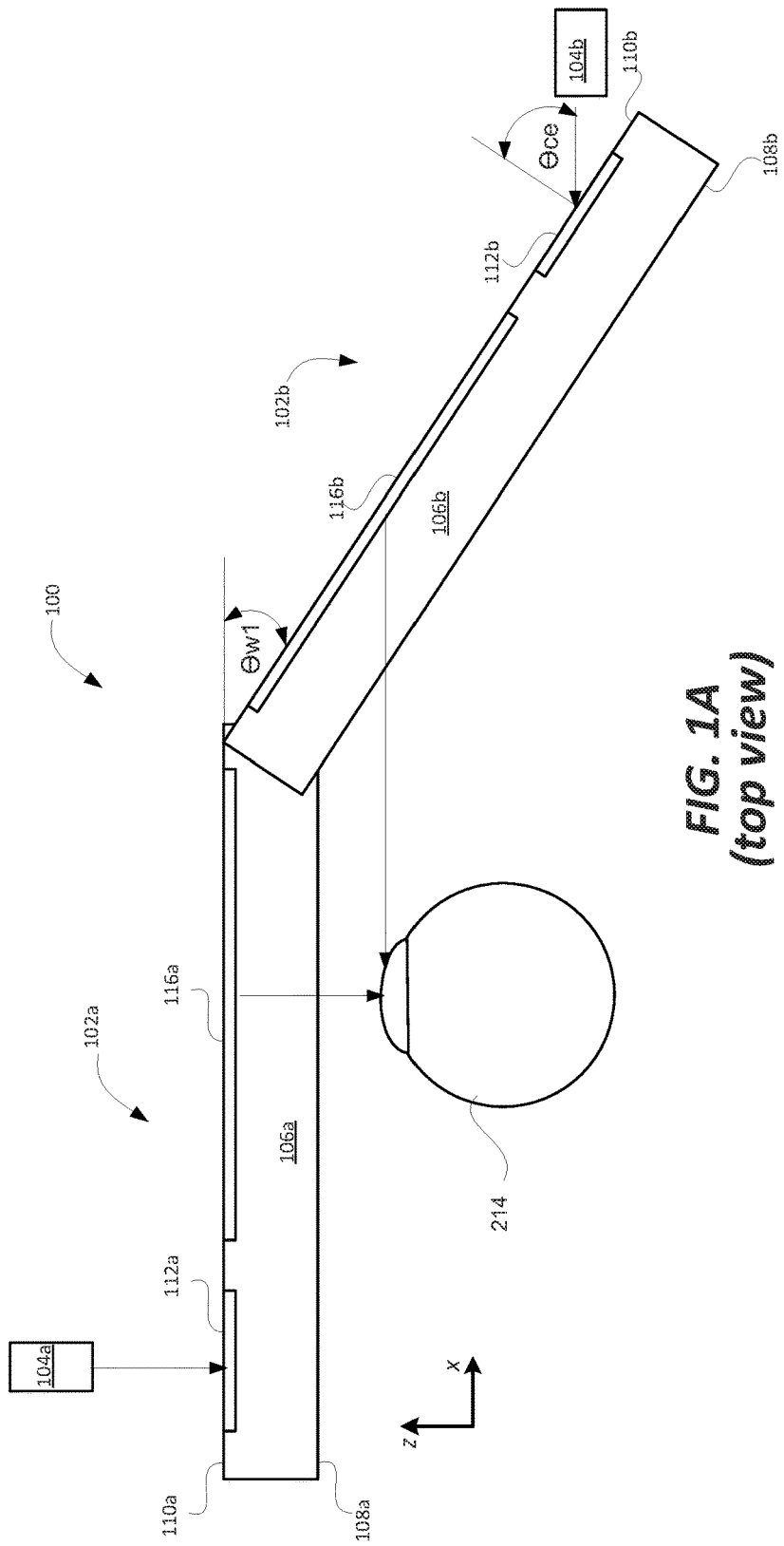
FIG. 1A is a top view of one embodiment of an optical waveguide assembly.

FIG. 1A is a top view of one embodiment of an optical waveguide assembly 100. The optical waveguide assembly 100 may be part of a head mounted display, or heads up display, for example. The assembly 100 has a main optical waveguide 102a, a peripheral optical waveguide 102b, a main light engine 104a, and a peripheral light engine 104b. The main light engine 104a and the peripheral light engine 104b may also be referred to as main and peripheral "display engines," respectively. The optical waveguide assembly 100 provides for a very large FOV. The optical waveguide assembly 100 may provide for a diagonal FOV in the range of 120 to 140 degrees. The diagonal FOV may be even larger than 140 degrees, and is not required to be as large as 120 degrees to provide significant benefits.

FIG. 1B is a front view of one embodiment of the peripheral optical waveguide 102b of FIG. 1A. In one embodiment, the main optical waveguide 102a of FIG. 1A has the same general configuration as the waveguide of FIG. 1B. FIG. 1C is a side view of one embodiment of the peripheral optical waveguide 102b of FIG. 1A. In one embodiment, the main optical waveguide 102a of FIG. 1A has the same general configuration as the waveguide of FIG. 10.

With reference to the waveguides of FIGS. 1A-1C, the main optical waveguide 102a has an input coupler 112a which couples in light from the main light engine 104a. The input coupler 112a may have a diffractive optical element, and hence may also be referred to as an input diffractive coupler. The main optical waveguide 102a has an output coupler 116a that couples light out to an eye 214 of a user that may be wearing the optical waveguide assembly 100. This light may be received by a central portion of the user's vision. For simplicity, a single ray of light that is normal to the output coupler 116a is depicted as being coupled to the user's eye 214. In actuality, the light may have a range of angles.

A ray is depicted between the main light engine 104a and input coupler 112a. The central angle of incidence ($\Theta_{ce}$) between the main light engine 104a and input coupler 112a is small in this embodiment. The central angle of incidence is defined with respect to the angle between the light ray and a line normal to the input coupler 112a. Not all of the light rays from the main light engine 104a are parallel to each other. Hence, the light rays from the main light engine 104a may cover a range of angles (with respect to the surface normal of input coupler 112a). The central angle refers to the light ray in the center of this range of angles. The central angle of incidence ($\Theta_{ce}$) may be zero degrees or close to zero degrees ($\Theta_{ce}$). A small central angle of incidence can be beneficial in being able to allow a high resolution image to be coupled in to the waveguide 102a. Thus, in one embodiment, the main light engine 104a projects a high resolution image.

The peripheral optical waveguide 102b has an input coupler 112b which couples in light from the peripheral light engine 104b. The input coupler 112b may have a diffractive optical element, and hence may also be referred to as an input diffractive coupler. The peripheral optical waveguide 102b has an output coupler 116b that couples light out to the eye 214 of the user. This light may be received by a peripheral portion of the user's vision. For simplicity, a single ray of light is depicted as being coupled to the user's eye 214. In actuality, the light may have a range of angles.

In general, the optical waveguide assembly 100 may be configured such that the light projected out of the peripheral optical waveguide 102b will intersect with the light projected out of the first optical waveguide 102a (absent any obstructions). Thus, the main optical waveguide 102a may provide a first portion of an image to a central portion of the user's vision, while the peripheral optical waveguide 102b may provide a second portion of the image to a peripheral portion of the user's vision.

More generally, the main optical waveguide 102a may provide a first portion of an image to a first portion of the user's vision, while the peripheral optical waveguide 102b may provide a second portion of the image to a second portion of the user's vision. The first and second portions of the user's vision could possibly overlap to some extent. Also, there could be a gap between the first and second portions of the user's vision. For example, with reference to a horizontal field of view, the main optical waveguide 102a may cover a range of angles from −15 degrees to +15 degrees, while the peripheral optical waveguide 102b may cover a range of angles from +15 degrees to +85 degrees (e.g., no overlap and no gap). As another example, the main optical waveguide 102a may cover a range of angles from −15 degrees to +15 degrees, while the peripheral optical waveguide 102b may cover a range of angles from +35 degrees to +105 degrees (e.g., gap). As another example, the main optical waveguide 102a may cover a range of angles from −17.5 degrees to +17.5 degrees, while the peripheral optical waveguide 102b may cover a range of angles from +15 degrees to +75 degrees (some overlap is possible).

The central angle of incidence ($\Theta_{ce}$) between the peripheral light engine 104b and input coupler 112b is relatively large in this embodiment. As one example, the central angle of incidence could be about 60 degrees. In one embodiment, the central angle of incidence is at least 30 degrees. A large central angle of incidence may allow for an image having a large FOV to be coupled in to the peripheral waveguide 102b, and coupled out to the user's eye 214. For example, a central angle of incidence of 60 degrees may allow for a FOV of 48 degrees.

In some embodiments, the optical waveguide assembly 100 provides a large horizontal FOV. Having a large horizontal FOV may also provide for a large diagonal FOV. The configuration of the optical waveguide assembly 100 may be modified to provide for a large vertical FOV.

In some embodiments, the peripheral light engine 104b projects a lower resolution image than the main light engine 104a. Thus, a tradeoff of higher FOV with lower resolution is made for the peripheral optical waveguide 102b, in some embodiments. Note that for many applications a high resolution is not needed in the peripheral vision. Hence, the combination of main light engine 104a and main optical waveguide 102a allows the user to see a very high resolution image in the central portion of their vision. The combination of peripheral light engine 104b and peripheral optical waveguide 102b greatly expands the overall FOV of the waveguide assembly 100, without sacrificing high resolution in the direct line of sight.

Figure 2A:
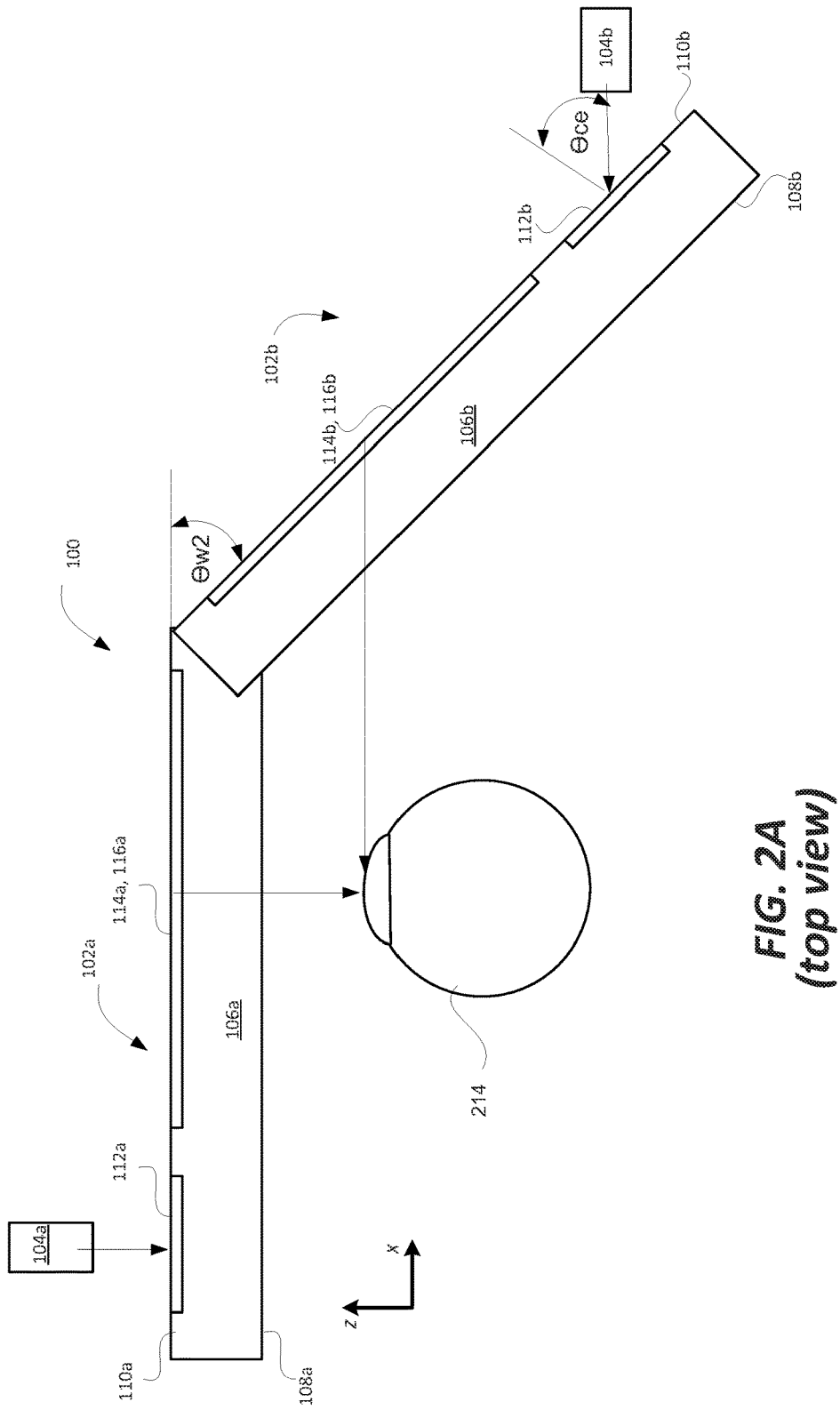
FIG. 2A depicts a top view of another embodiment of an optical waveguide assembly in which an intermediate coupler is added to the waveguides.

FIG. 2A depicts a top view of another embodiment of an optical waveguide assembly 100 in which an intermediate coupler 114 is added to the waveguides. For example, optical waveguide 102a has intermediate coupler 114a, and optical waveguide 102b has intermediate coupler 114b. The optical waveguide assembly 100 may be part of a head mounted display, or heads up display, for example. The assembly 100 has a main optical waveguide 102a, a peripheral optical waveguide 102b, a main light engine 104a, and a peripheral light engine 104b. The optical waveguide assembly 100 provides for a very large FOV.

Figure 2C:
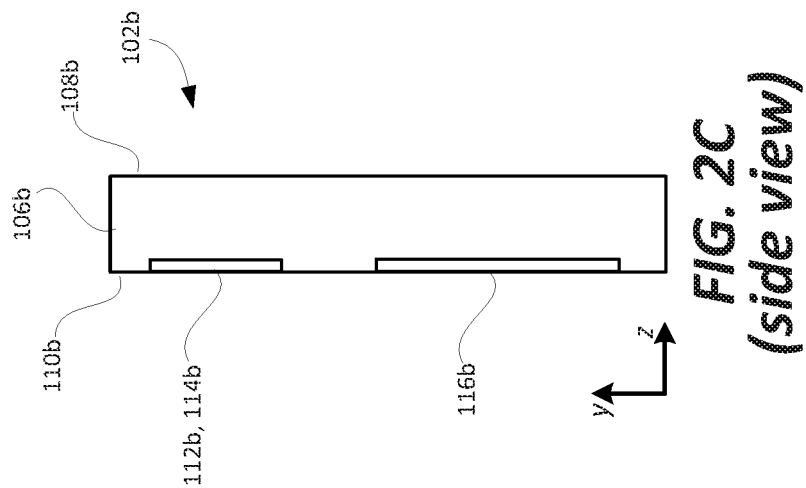
FIG. 2C is a side view of one embodiment of the peripheral optical waveguide 102b of FIG. 2A.
Figure 2B:
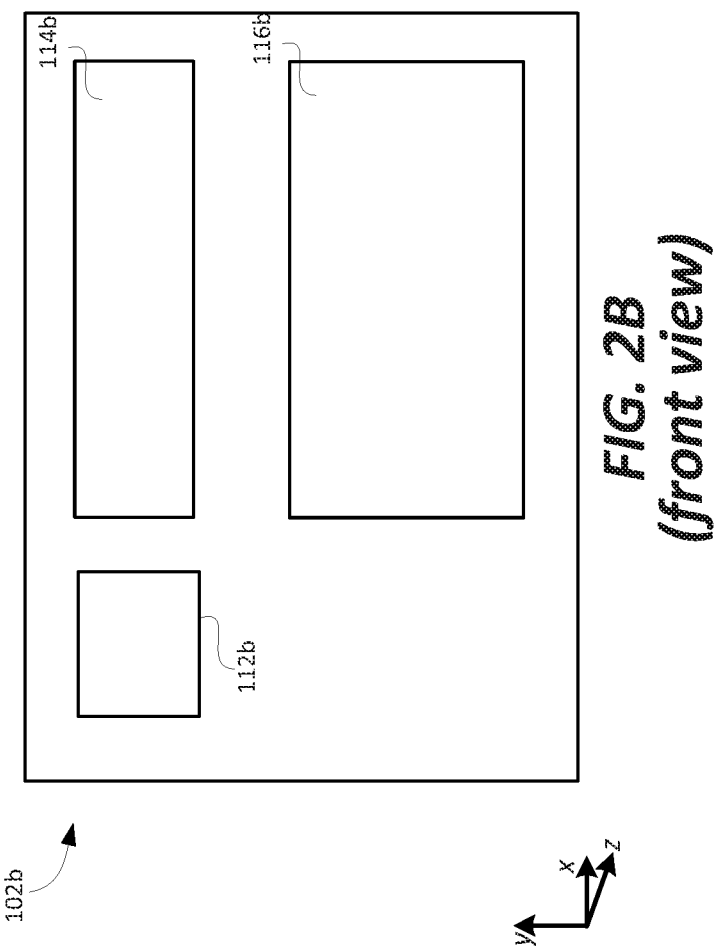
FIG. 2B is a front view of one embodiment of the peripheral optical waveguide 102b of FIG. 2A.

FIG. 2B is a front view of one embodiment of the peripheral optical waveguide 102b of FIG. 2A. In one embodiment, the main optical waveguide 102a of FIG. 2A has the same general configuration as the waveguide of FIG. 2B. FIG. 2C is a side view of one embodiment of the peripheral optical waveguide 102b of FIG. 2A. In one embodiment, the main optical waveguide 102a of FIG. 2A has the same general configuration as the waveguide of FIG. 2C.

Referring to FIGS. 1A, 1B, 1C, 2A, 2B, and 2C the optical waveguides 102 each include a bulk-substrate 106. For example, main optical waveguide 102a includes bulk-substrate 106a, and peripheral optical waveguide 102b includes bulk-substrate 106b. Thus, by referring to bulk-substrate 106 without a letter, the bulk-substrate 106a, 106b of either the main or peripheral waveguide is being referred to. Similar notation is used here for other reference characters.

Each bulk-substrate 106 has an input-coupler 112 and an output-coupler 116. The input-coupler 112 is configured to couple light corresponding to an image associated with an input-pupil into the bulk-substrate 106 of the waveguide. The output-coupler 116 is configured to couple the light corresponding to the image associated with the input-pupil, which travels in the optical waveguide 102 from the input-coupler 112 to the output-coupler 116, out of the waveguide 102 so that the light is output and viewable from the output-pupil.

The term "input-pupil," as used herein, refers to an aperture through which light corresponding to an image is overlaid on an input-coupler of a waveguide. The term "output-pupil," as used herein, refers to an aperture through which light corresponding to an image exits an output-coupler of a waveguide. An input-pupil is sometimes also referred to as an entrance-pupil, and an output-pupil is sometimes also referred to as an exit-pupil.

The bulk-substrate 106, which can be made of glass or optical plastic, but is not limited thereto, includes a first major planar surface 108 and a second major planar surface 110 opposite and parallel to the first major planar surface 108. For example, bulk-substrate 106a has first major planar surface 108a and a second major planar surface 110a, and bulk-substrate 106b has first major planar surface 108b and a second major planar surface 110b.

The first major planar surface 108 can alternatively be referred to as the front-side major surface 108 (or more simply the front-side surface 108), and the second major planar surface 110 can alternatively be referred to as the back-side major surface 110 (or more simply the back-side surface 110). As the term "bulk" is used herein, a substrate is considered to be "bulk" substrate where the thickness of the substrate (between its major surfaces) is at least ten times (i.e., 10×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major surfaces) is at least 6200 nm, i.e., at least 6.2 μm. In accordance with certain embodiments, the bulk-substrate 106 has a thickness of at least 25 μm between its major planar surfaces 108 and 110. In specific embodiments, the bulk-substrate 106 has a thickness (between its major surfaces) within a range of 100 μm to 1500 μm, with a likely thickness of about 1000 μm. The bulk-substrate 106, and more generally the waveguide 102, is transparent, meaning that it allows light to pass through it so that a user can see through the waveguide 102 and observe objects on an opposite side of the waveguide 102 than the user's eye(s).

The optical waveguides 102 in FIGS. 2A, 2B and 2C is also shown as including an intermediate-component 114, which can alternatively be referred to as an intermediate-zone 114. Where the waveguide 102 includes the intermediate-component 114, the input-coupler 112 is configured to couple light into the waveguide 102 (and more specifically, into the bulk-substrate 106 of the waveguide 102) and in a direction of the intermediate-component 114. The intermediate-component 114 is configured to redirect such light in a direction of the output-coupler 116. Further, the intermediate-component 114 is configured to perform one of horizontal or vertical pupil expansion, and the output-coupler 116 is configured to perform the other one of horizontal or vertical pupil expansion, in one embodiment. For example, the intermediate-component 114 can be configured to perform horizontal pupil expansion, and the output-coupler 116 can be configured to vertical pupil expansion. Alternatively, if the intermediate-component 114 were repositioned, e.g., to be below the input-coupler 112 and to the left of the output-coupler 116 shown in FIG. 2B, then the intermediate-component 114 can be configured to perform vertical pupil expansion, and the output-coupler 116 can be configured to perform horizontal pupil expansion.

The input-coupler 112, the intermediate-component 114 and the output-coupler 116 can be referred to collectively herein as optical components 112, 114 and 116 of the waveguide, or more succinctly as components 112, 114 and 116.

It is possible that a waveguide includes an input-coupler and an output-coupler, without including an intermediate-components, as depicted in FIGS. 1A-1C. In such embodiments, the input-coupler 112 may be configured to couple light into the waveguide and in a direction toward the output-coupler 116. In such embodiments, the output-coupler 116 can provide one of horizontal or vertical pupil expansion, depending upon implementation.

In FIG. 1B, the input-coupler 112 and the output-coupler 116, are shown as having rectangular outer peripheral shapes, but can have alternative outer peripheral shapes. In addition, in FIG. 2B, the intermediate-component 114 is shown as having a rectangular outer peripheral shape, but can have alternative outer peripheral shapes.

For example, the input-coupler 112 can alternatively have a circular outer peripheral shape, but is not limited thereto. For another example, the intermediate-component can have a triangular or hexagonal outer peripheral shape, but is not limited thereto. Further, it is noted that the corners of each of the peripheral shapes, e.g., where generally rectangular or triangular, can be chamfered or rounded, but are not limited thereto. These are just a few exemplary outer peripheral shapes for the input-coupler 112, the intermediate-component 114 and the output-coupler 116, which are not intended to be all encompassing.

As can best be appreciated from FIGS. 1A and 1C, the input-coupler 112 and the output-coupler 116 are both shown as being provided in or on a same surface (i.e., the back-side surface 110) of the waveguide 102. Likewise, FIGS. 2A and 2C show that the input-coupler 112, the intermediate-component 114 and the output-coupler 116 are all shown as being provided in or on a same surface (i.e., the back-side surface 110) of the waveguide 102. In such a case, the input-coupler 112 can be transmissive (e.g., a transmission grating), the intermediate-component 114 (if used) can be reflective (e.g., a reflective grating), and the output-coupler 116 can also be reflective (e.g., a further reflective grating). The input-coupler 112, the intermediate-component 114 (if used) and the output-coupler 116 can alternatively all be provided in the front-side surface 110 of the waveguide 102. In such a case, the input-coupler 112 can be reflective (e.g., a reflective grating), the intermediate-component 114 (if used) can be reflective (e.g., a further reflective grating), and the output-coupler 116 can be transmissive (e.g., a transmission grating).

Alternatively, the input-coupler 112, the intermediate-component 114 and the output-coupler 116 can all be embedded (also referred to as immersed) in the bulk-substrate 106. For example, the bulk-substrate 106 can be separated into two halves (that are parallel to the major surfaces 108 and 110), and the input-coupler 112, the intermediate-component 114 and the output-coupler 116 can be provided in (e.g., etched into) one of the inner surfaces of the two halves, and the inner surfaces of the two halves can be adhered to one another. Alternatively, the bulk-substrate 106 can be separated into two halves (that are parallel to the major surfaces 108 and 110), and the input-coupler 112, the intermediate-component 114 and the output-coupler 116 can be provided between the inner surfaces of the two halves. Other implementations for embedding the input-coupler 112, the intermediate-component 114 and the output-coupler 116 in the bulk-substrate 106 are also possible, and within the scope of the embodiments described herein. It is also possible that one of the input-coupler 112, the intermediate-component 114 and the output-coupler 116 is provided in or on the front-side surface 108 of the waveguide 102, another one of the components 112, 114 and 116 is provided in or on the back-side surface 110, and the last one of the components 112, 114 and 116 is embedded or immersed in the bulk-substrate 106. More generally, unless stated otherwise, any individual one of the input-coupler 112, the intermediate-component 114 and the output-coupler 116 can be provided in or on either one of the major planar surfaces 108 or 110 of the bulk-substrate 106, or embedded therebetween.

The input-coupler 112, the intermediate-component 114 and the output-coupler 116 can each be implemented as a diffraction grating, or more generally, as a diffractive optical element (DOE). A diffraction grating is an optical component that may contain a periodic structure that causes incident light to split and change direction due to an optical phenomenon known as diffraction. The splitting (known as optical orders) and angle change depend on the characteristics of the diffraction grating. When the periodic structure is on the surface of an optical component, it is referred to a surface grating. When the periodic structure is due to varying of the surface itself, it is referred to as a surface relief grating (SRG). For example, an SRG can include uniform straight grooves in a surface of an optical component that are separated by uniform straight groove spacing regions. Groove spacing regions can be referred to as "lines", "grating lines" or "filling regions". A DOE having uniform straight grooves is an example of a one-dimensional (1D) ruled grating. The DOE is not limited to 1D ruled gratings. The DOE could include a two-dimensional (2D) grating. For example, the DOE could include a 2D crossed grating. A crossed grating may also be referred to as a doubly periodic grating. Examples of doubly periodic DOEs include, but are not limited to, a 2D arrays of holes, and a 2D array of pillars. The two periods of a doubly periodic DOE do not have to be perpendicular to each other. The nature of the diffraction by an SRG depends on the wavelength, polarization and angle of light incident on the SRG and various optical characteristics of the SRG, such as refractive index, line spacing, groove depth, groove profile, groove fill ratio and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mold or mask for manufacturing further optical components. An SRG is an example of a Diffractive Optical Element (DOE). When a DOE is present on a surface (e.g. when the DOE is an SRG), the portion of that surface spanned by that DOE can be referred to as a DOE area. A diffraction grating, instead of being a surface grating, can alternatively be a volume grating, such as a Bragg diffraction grating. It is also possible that one or more of the couplers are manufactured as SRGs and then covered within another material, e.g., using an atomic layer deposition process or an aluminum deposition process, thereby essentially burying the SRGs such that the major planar waveguide surface(s) including the SRG(s) is/are substantially smooth. Such a coupler is one example of a hybrid of a surface and volume diffraction grating. Any one of the input-coupler 112, the intermediate-component 114 and the output-coupler 116 can be, e.g., a surface diffraction grating, or a volume diffraction grating, or a hybrid of a surface and volume diffraction grating. Any one of the input-coupler 112, the intermediate-component 114 and the output-coupler 116 can be a polarization grating. In accordance with embodiments described herein, each diffraction grating can have a preferential linear polarization orientation specified by a direction of the grating lines of the diffraction grating, wherein the coupling efficiency for light having the preferential linear polarization orientation will be higher than for light having a non-preferential linear polarization orientation.

Where the input-coupler 112, the intermediate-component 114 and/or the output-coupler 116 is an SRG, each such SRG can be etched into one of the major planar surfaces 108 or 110 of the bulk-substrate 106. In such embodiments, the SRG can be said to be formed "in" the bulk-substrate 106. Alternatively, each SRG can be physically formed in a coating that covers one of the major planar surfaces 108 or 110 of the bulk-substrate 106, in which case each such SRG can be said to be formed "on" the bulk-substrate 106. Either way, the components 112, 114 and 116 are considered parts of the waveguide 102.

In one embodiment, the peripheral optical waveguide 102b is a planar waveguide. In one embodiment, the main optical waveguide 102a is a planar waveguide. Herein, the term "planar waveguide" refers to the planar major surfaces 108, 110. FIG. 1A shows an angle ($\Theta_{w1}$) between second major planar surface 110a and second major planar surface 110b of the two waveguides 102a, 102b. FIG. 2A shows an angle ($\Theta_{w2}$) between second major planar surface 110a and second major planar surface 110b the two waveguides 102a, 102b. The angle ($\Theta_w$—referring to either $\Theta_{w1}$ or $\Theta_{w2}$) is not limited to any particular angle. In some embodiments, $\Theta_w$ is between 30 degrees and 90 degrees. However, $\Theta_w$ can be less than 30 degrees or greater than 90 degrees.

Having the angle between the second major planar surfaces 110a, 110b allows the optical waveguide assembly 100 to wrap around the user's eye 214 in the horizontal direction, to some extent. This helps to provide a large horizontal FOV without requiring one or more very large waveguides. For example, were there to be no angle between the two waveguides 102a, 102b, the peripheral waveguide 102b might need to be much lager to provide the same horizontal FOV.

Thus, the configuration can provide a large horizontal (as well as diagonal) FOV without requiring large, bulky waveguides.

Referring specifically to FIG. 2B, in an exemplary embodiment, the input-coupler 112 can have surface gratings that extend in a vertical (y) direction, the output-coupler 116 can have surface gratings that extend in a horizontal (x) direction, and the intermediate-component 114 can have surface gratings that extend diagonal (e.g., ~45 degrees) relative to the horizontal and vertical directions. This is just an example. Other variations are also possible.

Referring specifically to FIG. 1B, in an exemplary embodiment, the input-coupler 112 can have surface gratings that extend in a vertical (y) direction, the output-coupler 116 can have surface gratings that extend in a horizontal (x) direction. This is just an example. Other variations are also possible.

More generally, the input-coupler 112, the intermediate-component 114 and the output-coupler 116 can have various different outer peripheral geometries, can be provided in or on either of the major planar surfaces of the bulk-substrate, or can be embedded in the bulk-substrate 106, and can be implemented using various different types of optical structures, as can be appreciated from the above discussion, and will further be appreciated from the discussion below.

In general, light corresponding to an image, which is coupled into the waveguide via the input-coupler 112, can travel through the waveguide from the input-coupler 112 to the output-coupler 114, by way of total internal refection (TIR). TIR is a phenomenon which occurs when a propagating light wave strikes a medium boundary (e.g., of the bulk-substrate 106) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using equation 1:

$$\theta_c = \sin^{-1}(n2/n1) \quad (1)$$

where $\theta_c$ the critical angle for two optical mediums (e.g., the bulk-substrate 106, and air or some other medium that is adjacent to the bulk-substrate 106) that meet at a medium boundary, n1 is the index of refraction of the optical medium in which light is traveling towards the medium boundary (e.g., the bulk-substrate 106, once the light is couple therein), and n2 is the index of refraction of the optical medium beyond the medium boundary (e.g., air or some other medium adjacent to the bulk-substrate 106).

The concept of light traveling through the waveguide 102, from the input-coupler 112 to the output-coupler 114, by way of TIR, can be better appreciated from FIGS. 3A and 3B. FIG. 3A shows a top view of the main waveguide 102a, and also shows a main light engine 104a that generates an image including angular content that is coupled into the main waveguide 102a by the input-coupler 112a. The main light engine 104a can include, e.g., an image former 206, a collimating lens 208 and an illuminator 210, but is not limited thereto. Also shown in FIG. 3A, is a representation of a human eye 214 that is using the main waveguide 102a to observe an image, produced using the main light engine 104a, as a virtual image. Note that although FIG. 3A only shows rays normal to the output coupler 116a, more generally the rays from the output coupler 116a may cover a range of angles. In FIG. 3A, the image is projected into a central portion of a user's vision, as represented by lines 304a, 304b. Lines 304a, 304b represent a horizontal FOV.

In FIG. 3A, the central angle of incidence of the light rays from the main light engine 104a is close to zero degrees. Thus, FIG. 3A is similar in configuration to the main light engine 104a and the main waveguide 102a of FIG. 1A.

FIG. 3B shows a top view of the peripheral waveguide 102b of FIG. 1A, and also shows a peripheral light engine 104b that generates an image including angular content that is coupled into the peripheral waveguide 102b by the input-coupler 112b. Also shown in FIG. 3B, is a representation of a human eye 214 that is using the waveguide 102b to observe an image, produced using the peripheral light engine 104b, as a virtual image. Note that although FIG. 3B shows only parallel rays from the output coupler 116b, more generally the rays from the output coupler 116b are not all parallel, but may cover a range of angles (this range of angles may depend on the range of angles of light rays coupled in to input coupler 112b).

In FIG. 3B, the central angle of incidence is fairly large. Thus, FIG. 3B is similar in configuration to the peripheral light engine 104b and the peripheral waveguide 102b of FIG. 1A. In FIG. 3B, the image is projected into a peripheral portion of a user's vision, as represented by lines 306a, 306b. Lines 306a, 306b represent a horizontal FOV.

Principles of light traveling through the waveguides, from the input-coupler 112 to the output-coupler 114, by way of TIR, may be similar for the main waveguide 102a and the peripheral waveguide 102b. The peripheral light engine 104b can include, e.g., an image former 206, a collimating lens 208 and an illuminator 210, but is not limited thereto. The image former 206 can be implemented using a transmissive projection technology where a light source is modulated by an optically active material, and backlit with white light. These technologies are usually implemented using liquid crystal display (LCD) type displays with powerful backlights and high optical energy densities. The illuminator 210 can provide the aforementioned backlighting. The image former 206 can also be implemented using a reflective technology for which external light is reflected and modulated by an optically active material. Digital light processing (DLP), liquid crystal on silicon (LCOS) and Mirasol® display technology from Qualcomm, Inc. are all examples of reflective technologies. Alternatively, the image former 206 can be implemented using an emissive technology where light is generated by a display, see for example, a PicoP™ display engine from Microvision, Inc. Another example of emissive display technology is a micro organic light emitting diode (OLED) display. Companies such as eMagin and Microoled provide examples of micro OLED displays. The image former 206, alone or in combination with the illuminator 210, can also be referred to as a micro display. The collimating lens 208 is arranged to receive a diverging display image from the image former 206, to collimate the display image, and to direct the collimated image toward the input-coupler 112 of the waveguide 102. In accordance with an embodiment, an entry pupil associated with the waveguide may be approximately the same size as an exit pupil associated with the image former 206, e.g., 5 mm or less in some embodiments, but is not limited thereto.

In FIGS. 3A and 3B, the display engines 104 are each shown as facing the back-side surface 110 of the waveguide 102, and the eye 214 is shown as facing the front-side surface 108 opposite and parallel to the back-side surface 110. This provides for a periscope type of configuration in which light enters the waveguide on one side of the waveguide 102, and exits the waveguide at an opposite side of the waveguide 102. Alternatively, the input-coupler 112 and the output-coupler 116 can be implemented in a manner such that the display engine 204 and the eye 214 are proximate to and face a same major planar surface (108 or 110).

The waveguide 102 can be incorporated into a see-through mixed reality display device system, but is not limited to use therewith. The waveguide 102 can be incorporated into a see-through, near-eye display system. A separate instance of the waveguide 102 and the display engine 204 can be provided for each of the left and right eyes of a user. In certain embodiments, such waveguide(s) 102 may be positioned next to or between see-through lenses, which may be standard lenses used in eye glasses and can be made to any prescription (including no prescription). Where a see-through mixed reality display device system is implemented as head-mounted display (HMD) glasses including a frame, the light engine 104 can be located to the side of the frame so that it sits near to a user's temple. Alternatively, the light engine 104 can be located in a central portion of the HMD glasses that rests above a nose bridge of a user. Other locations for the light engine 104 are also possible. In these instances, the user can also be referred to as a wearer. Where there is a separate waveguide for each of the left and right eyes of a user, there can be a separate display engine for each of the waveguides, and thus, for each of the left and right eyes of the user.

The configuration of the main light engine 104a and main optical waveguide 102a, described above with reference to FIGS. 1A, 2A, and 3A can support a field-of-view (FOV) of about 35 degrees, where the index of refraction of the bulk-substrate 106 is about 1.7 (i.e., n1~1.7). If the index of refraction of the bulk-substrate 106 is low (e.g., 1.5), the FOV may be even smaller (e.g., about 25 degrees). However, the configuration of the peripheral light engine 104b and peripheral optical waveguide 102b, described above with reference to FIGS. 1A, 2A, and 3B can support a much larger FOV.

Figure 4:
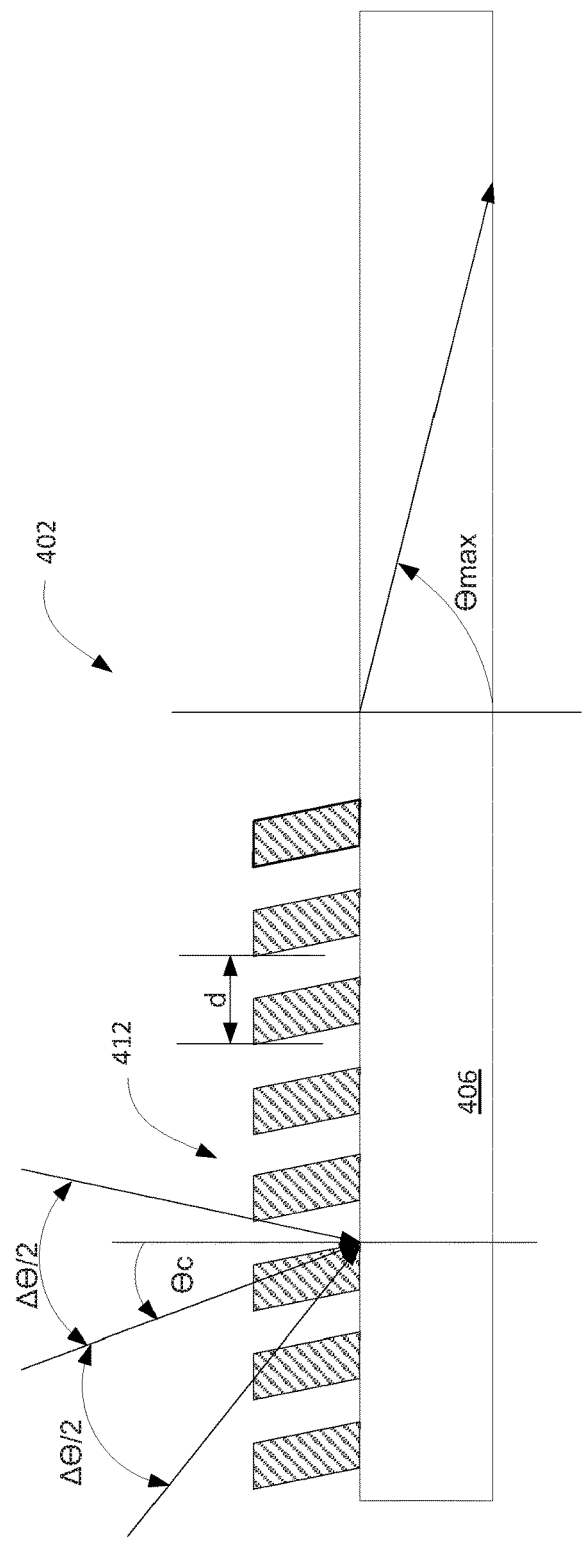
FIG. 4 is a diagram to help illustrate fundamental limitations with respect to the FOV.

FIG. 4 is a diagram to help illustrate fundamental limitations with respect to the FOV. FIG. 4 shows an optical waveguide 402 having a bulk substrate 406 and input coupler 412. The input coupler 412 has a diffractive grating with a period "d". The bulk substrate 406 has a refractive index "n". The maximum FOV in one dimension that can be coupled into the waveguide is governed by the refractive index of the waveguide. Assuming that the incident FOV (e.g., a range of angles $\Delta\theta$) is centered around origin (center angle $\theta_{cent}=0$), the maximal FOV that can be coupled in may be around $\Delta\theta=35°$ for glass with n=1.7, and may be small as $\Delta\theta=25°$ if the refractive index is 1.5. This is assuming that the maximum propagation angle inside the waveguide is $\theta_{max}=70°$, which is a typical value in optical waveguide displays. Note that the maximum propagation angle is not necessarily a clear cut boundary. The larger the maximum angle gets, the weaker the light-grating interaction at the extreme angles becomes. Thus, the image intensity at the borders tends to fall off if the angle goes much beyond 70 degrees.

One way to attempt to increase (also referred to as extend) the FOV is to increase the index of refraction of the bulk-substrate 406 of the optical waveguide 402, which would support a larger diagonal FOV. However, materials suitable for waveguides in head mounted displays (e.g., index matched UV curable resins) having such a high index of refraction are very expensive.

By increasing the central angle, the FOV can be greatly increased. The FOV supported by the waveguide may be governed by equation 2.

$$\Delta\theta = 2 \arcsin[(n \sin \theta_{max} - 1)/(2 \cos \theta_c)] \quad (2)$$

Assuming a refractive index of 1.5, and a maximum propagation angle of 70°, we find that $\Delta\theta=24°$ for $\theta_{cent}=0$, and $\Delta\theta=25°$ for $\theta_{cent}=20°$ for instance. However, if we increase the center angle, for example, to $\theta_{cent}=60°$, we find that the FOV has doubled to $\Delta\theta=48°$. As one example, the peripheral waveguide 102b may cover the angular range from 36° to 84°.

Thus, embodiments of the peripheral waveguide 102b makes use of large angles of incidence to couple very large FOVs into the peripheral waveguide 102b, as depicted in FIGS. 1A, 2A, and 3A. Assuming that the input coupler 112b is formed on the surface of the second major surface 110b, the angle between the second major surface 110b of peripheral waveguide 102b and the nominal (center) ray is very large. In one embodiment, the angle between the second major surface 110b of the peripheral waveguide 102b and the nominal (center) ray is at least 30 degrees. In one embodiment, the angle between a normal to the second planar surface 110b of the peripheral waveguide 102b and the nominal (center) ray is about 60 degrees. The angle could be greater or less than 60 degrees. Using such large angles leads to the increase in the maximum FOV that can be coupled in to the peripheral waveguide 102b.

In FIGS. 1A, 1B, 1C, 2A, 2B, 2C, 3A, and 3B the main and peripheral waveguides 102a, 102b were typically shown as including a pair of planar surfaces 108, 110. In one embodiment, surfaces of the main waveguide 102a are curved. In one embodiment, surfaces of the peripheral waveguide 102b are curved. In one embodiment, surfaces of both the main waveguide 102a and the peripheral waveguide 1022 are curved.

Figure 5:
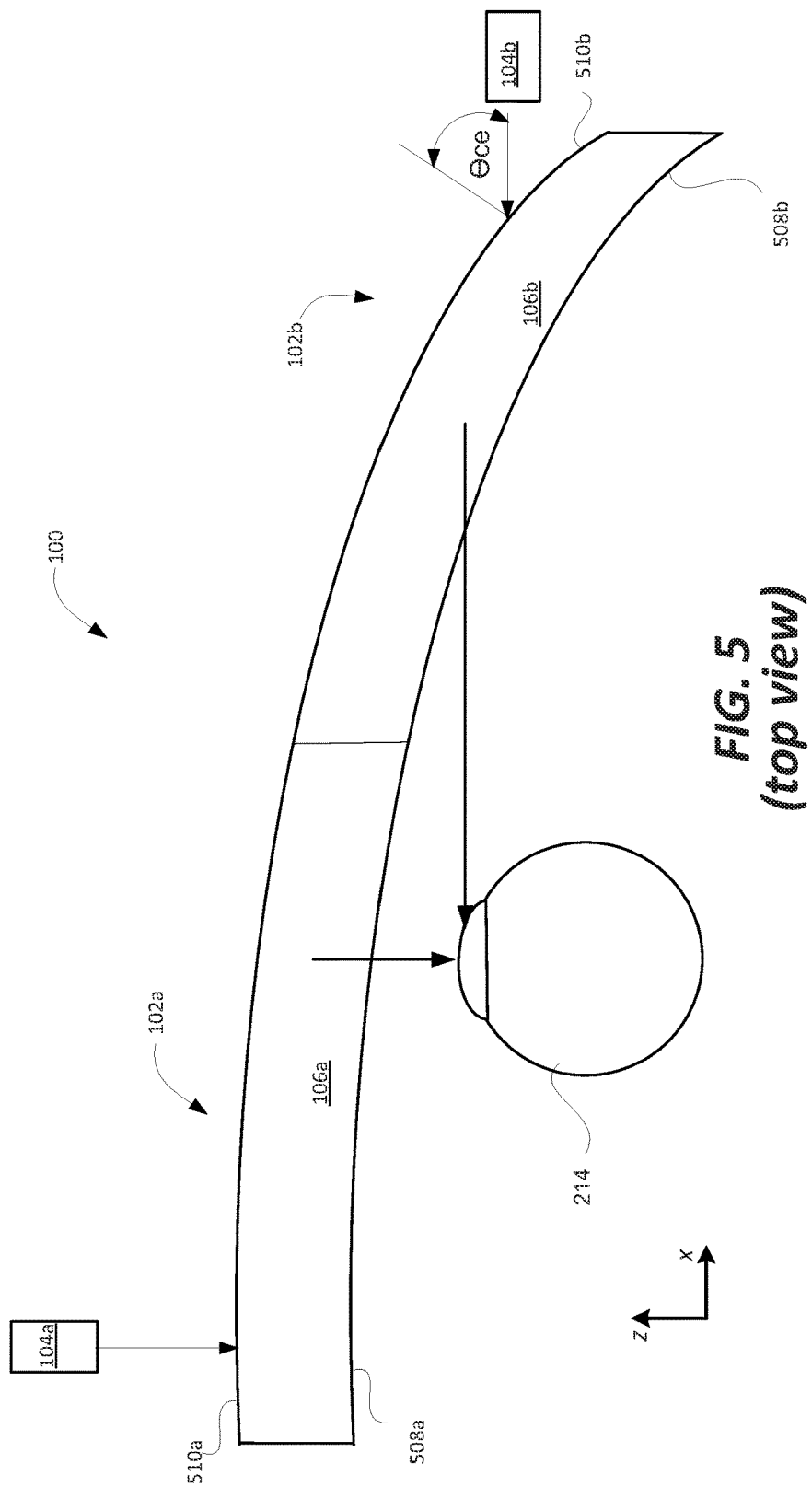
FIG. 5 is a diagram that illustrates one embodiment in which major surfaces of both the main waveguide and the peripheral waveguide are curved.

FIG. 5 is a diagram that illustrates one embodiment in which major surfaces of both the main waveguide 102a and the peripheral waveguide 102b are curved. The main waveguide 102a has first major curved surface 508a and second major curved surface 510a opposite and substantially parallel to the first major curved surface 508a. The peripheral waveguide 10b has first major curved surface 508b and second major curved surface 510b opposite and substantially parallel to the first major curved surface 508b.

The central angle of incidence between the main light engine 104a and the second major curved major surface 510a is zero degrees or close to zero degrees. The central angle of incidence between the peripheral light engine 104b and the second major curved major surface 510b is relatively large. In one embodiment, the angle between a normal line to the second major curved major surface 510b and the nominal (center) ray is about 60 degrees. The angle could be greater or less than 60 degrees.

The main waveguide 102a of the embodiment of FIG. 5 has an input coupler and an output coupler. Likewise, the peripheral waveguide 102b of the embodiment of FIG. 5 has an input coupler and an output coupler. The input couplers and output couplers are not depicted in FIG. 5. The input couplers are located in a suitable location to couple in light from the respective light engines 104a, 104b. The output couplers are located in a suitable location to couple out light to the user's eye 214.

A wide variety of input couplers and output couplers could be used with the curved major surface waveguides. For example, the input coupler and the output coupler could be a diffraction grating, or more generally, as a diffractive optical element (DOE). Also, the input coupler is not required to be located at the surface of second curved major surface 510b.

Figure 6:
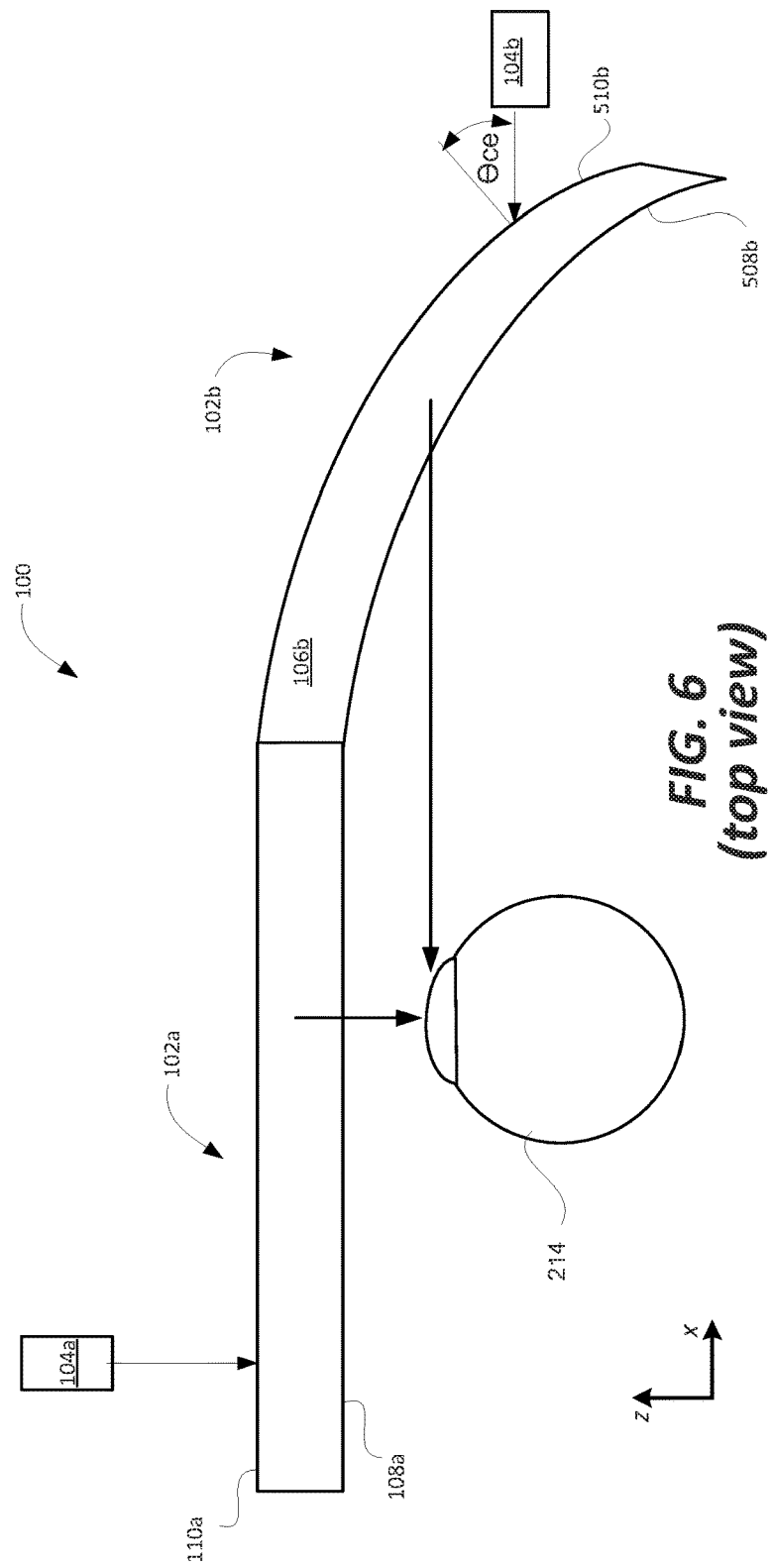
FIG. 6 is a diagram that illustrates one embodiment in which major surfaces of the main waveguide are planar, but major surfaces of the peripheral waveguide are curved.

FIG. 6 is a diagram that illustrates one embodiment in which major surfaces of the main waveguide 102a are planar, but major surfaces of the peripheral waveguide 102b are curved. The main waveguide 102a has first major planar surface 108a and second major planar surface 110a opposite and substantially parallel to the first major planar surface 108a. The peripheral waveguide 102b has first major curved major surface 508b and second major curved surface 510b opposite and substantially parallel to the first major curved surface 508b.

The central angle between the main light engine 104a and the second major curved planar 110a is zero degrees or close to zero degrees. The central angle between the peripheral light engine 104b and the second major curved surface 510b is relatively large. In one embodiment, the angle between a normal line to the second major curved surface 510b and the nominal (center) ray is about 60 degrees. The angle could be greater or less than 60 degrees.

The main waveguide 102a of the embodiment of FIG. 6 has an input coupler and an output coupler. Likewise, the peripheral waveguide 102b of the embodiment of FIG. 6 has an input coupler and an output coupler. The input couplers and output couplers are not depicted in FIG. 6. The input couplers are located in a suitable location to couple in light from the respective light engines 104a, 104b. The output couplers are located in a suitable location to couple out light to the user's eye 214. A wide variety of input couplers and output couplers could be used with the curved major surface waveguides. For example, the input coupler and the output coupler could be a diffraction grating, or more generally, as a diffractive optical element (DOE). Also, the input coupler is not required to be located at the surface of second major curved surface 510b.

The configurations of FIGS. 5 and 6 each provide for an optical waveguide assembly 100 that wraps around the user's eye 214 in the horizontal direction, to some extent. This helps to provide a large horizontal FOV without requiring one or more very large waveguides. Thus, the configurations in FIGS. 5 and 6 can provide a large horizontal (as well as diagonal) FOV without requiring large, bulky waveguides.

Figure 7A:
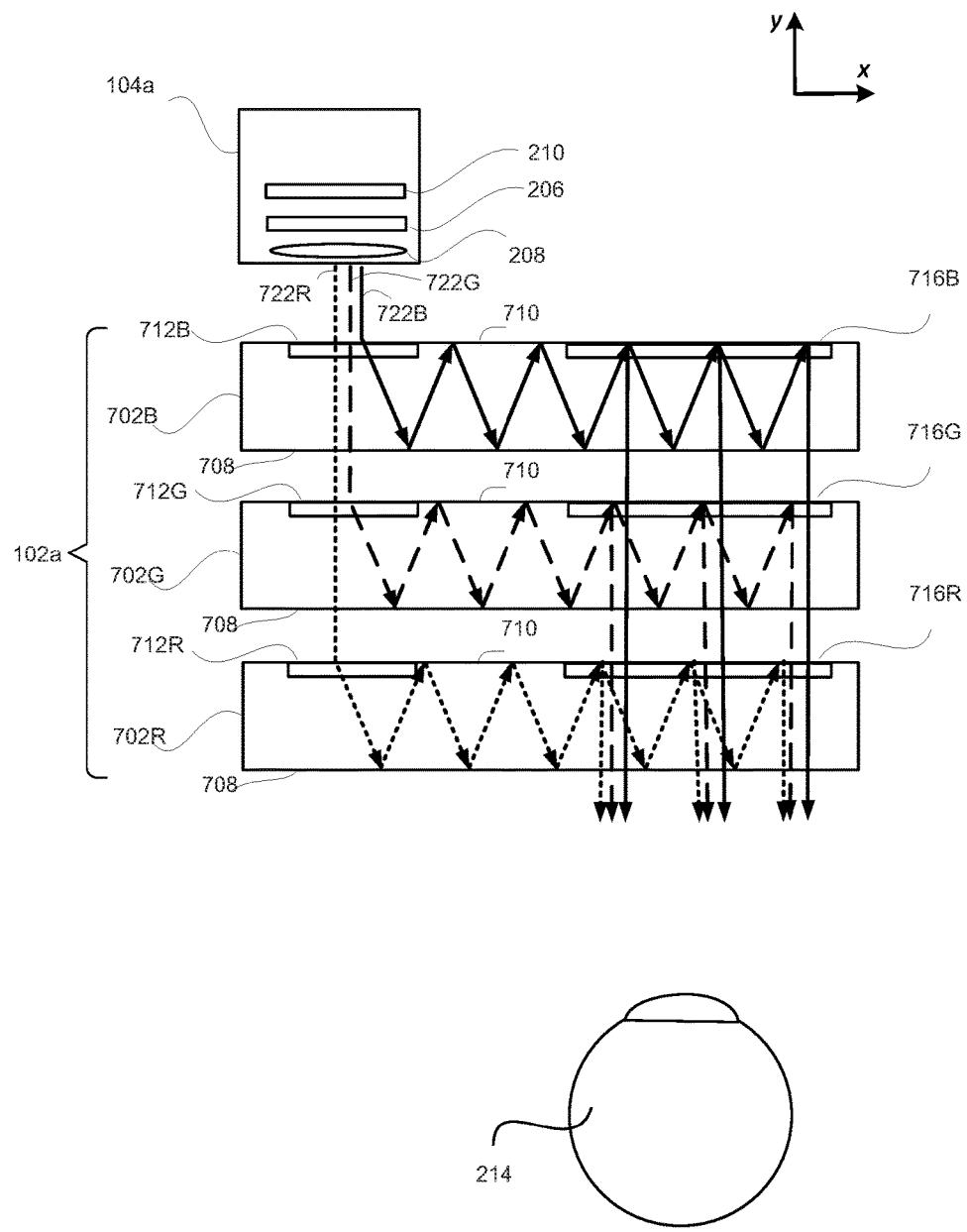
FIG. 7A is a diagram showing further details of one embodiment in which the main waveguide comprises a stack of waveguides.

In some embodiments, the waveguides 102a and/or 102b comprise a stack. FIG. 7A is a diagram showing further details of one embodiment in which the main waveguide 102a comprises a stack of waveguides. The main waveguide 102a is shown as including three waveguides labeled 702R, 702G, 702B (each of which can be similar to the waveguide 102a introduced with reference to FIGS. 1A, 1B, and 1C) and a main light engine 104a that generates an image including angular content that is coupled into the waveguides 702R, 702G, 702B by the input-couplers 712R, 712G and 712B. Also depicted are an image former 206 and a collimating lens 208.

FIG. 7A also shows a human eye 214 that is viewing the image (as a virtual image) within an eye box that is proximate the output-couplers 716R, 716G and 716B. Explained another way, the human eye 214 is viewing the image from an exit pupil associated with the waveguides 702R, 702G, 702B.

The waveguides 702R, 702G, 702B can be configured, respectively, to transfer red, green and blue light corresponding to an image from an entrance pupil to an exit pupil. More specifically, an input-coupler 712R of the waveguide 702R can be configured to couple light (corresponding to the image) within a red wavelength range into the waveguide 702R, and the output-coupler 716R of the waveguide 702R can be configured to couple light (corresponding to the image) within the red wavelength range (which has travelled from the input-coupler 712R to the output-coupler 716R by way of TIR) out of the waveguide 702R. Similarly, an input-coupler 712G of the waveguide 702G can be configured to couple light (corresponding to the image) within a green wavelength range into the waveguide 702G, and the output-coupler 716G of the waveguide 702G can be configured to couple light (corresponding to the image) within the green wavelength range (which has travelled from the input-coupler 712G to the output-coupler 716G by way of TIR) out of the waveguide 702G. Further, an input-coupler 712B of the waveguide 702B can be configured to couple light (corresponding to the image) within a blue wavelength range into the waveguide 702B, and the output-coupler 716B of the waveguide 700B can be configured to couple light (corresponding to the image) within the blue wavelength range (which has travelled from the input-coupler 712B to the output-coupler 716B by way of TIR) out of the waveguide 702B. In accordance with an embodiment, the red wavelength range is from 600 nm to 650 nm, the green wavelength range is from 500 nm to 550 nm, and the blue wavelength range is from 430 nm to 480 nm. Other wavelength ranges are also possible.

The distance between adjacent waveguides 702B, 702G, 702B of the main waveguide 102a can be, e.g., between approximately 50 micrometers (μm) and 300 μm, but is not limited thereto. While not specifically shown, spacers can be located between adjacent waveguides to maintain a desired spacing therebetween. The input-couplers 712G, 712R and 712B can be referred to collectively as the input-couplers 712, or individually as an input-coupler 712. Similarly, the output-couplers 716G, 716R and 716B can be referred to collectively as the output-couplers 716, or individually as an output-coupler 716. While the main waveguide 102a (in this case a waveguide stack) is shown as including three waveguides, it is also possible that a waveguide stack include more or fewer than three waveguides.

Each of the input-couplers 712 have an input angular range, and each of the output-coupler 716 have an output angular range. In accordance with certain embodiments, all of the input-couplers 712 have substantially the same input angular range, and all of the output-couplers 716 have substantially the same output angular range. In accordance with certain embodiments, the input angular range for the input-couplers 712 is substantially the same as the output angular range for the output-couplers 716. Values are considered to be substantially the same if they are within 5% of one another. In accordance with certain embodiments, the input angular range and the output angular range are each approximately +/−15 degrees relative to the normal. Smaller or larger input and output angular ranges are also possible, and within the scope of embodiments described herein.

Each input-coupler 712 and output-coupler 716 of a waveguide can have a preferential polarization orientation, wherein the coupling efficiency for light having the preferential polarization orientation will be higher than for light having a non-preferential polarization orientation. For example, where a coupler is a diffraction grating, the preferential polarization orientation may be specified by a direction of the grating lines of the diffraction grating. If the light engine 104 is configured to output an image comprising light having a first linear polarization orientation, then the input-coupler 712 and the output-coupler 716 of one or more waveguides (that is/are configured to transfer light corresponding to the image from an entrance pupil to an exit pupil, where the image can be viewed, and to perform pupil expansion) can be configured to have the first linear polarization orientation as its preferential linear polarization orientation.

The preferential polarization orientation of a coupler (e.g., 712 or 716) can be a linear polarization orientation, which can either be a P linear polarization orientation, or an S linear polarization orientation, which orientations are orthogonal relative to one another. It is also possible that the preferential linear polarization orientation of a coupler can be a polarization that is neither a P linear polarization orientation, nor an S linear polarization orientation, but rather, is a polarization orientation that is oriented somewhere between the S and P linear polarization orientations. The P linear polarization orientation is also known as transverse-magnetic (TM), and the S linear polarization orientation is also known as transverse-electric (TE). The input-coupler 712 and the output-coupler 116 of a waveguide can have the same preferential linear polarization orientation. Alternatively, the input-coupler 712 and the output-coupler 716 of a waveguide can have different preferential linear polarization orientations from one another, which may be the case, e.g., where the waveguide includes in intermediate-component that rotates the polarization of internally reflected light as the light travels within the waveguide from the input-coupler 712 to the intermediate-component, and then from the intermediate-component to the output-coupler 716. It is also possible that a preferential polarization of one or more of the couplers is a circular polarization.

FIG. 7A is not intended illustrate the precise locations of the main light engine 104a relative to the main waveguide 102A. In FIG. 7A, the central angle of incidence is zero degrees, or close to zero degrees.

As noted above in the discussion of FIGS. 2A-2C, each of the waveguides can optionally include an intermediate-component which may perform one of horizontal and vertical pupil expansion, and the output-coupler 716 can perform the other one of horizontal or vertical pupil expansion.

The main light engine 104a can include red, green and/or blue light sources that are configured to respectively produce red light within a corresponding red wavelength range, green light within a corresponding green wavelength range and blue light within a corresponding blue wavelength range. For example, the light engine 104a can include red, green and blue light emitting diode (LEDs), super luminescent light emitting diodes (SLEDs), a quantum dot light emitting diodes (QD-LED), or laser diodes (LDs), but is not limited thereto. In accordance with an embodiment, the red wavelength range is from 600 nm to 650 nm, the green wavelength range is from 500 nm to 550 nm, and the blue wavelength range is from 430 nm to 480 nm, as noted above. Narrower or wider wavelength ranges are also possible.

In FIG. 7A, the thick dotted arrowed line 722R is representative of red (R) light corresponding to an image that is output by the light engine 104, the thick dashed arrowed line 722G is representative of green (G) light corresponding to the image that is output by the light engine 104, and the thick solid arrowed line 722B is representative of blue (B) light corresponding to the image that is output by the main light engine 104a. While the waveguides 702R, 702G and 702B are shown as being stacked in a specific order, the order in which the waveguides are stacked can be changed.

When implemented as an input diffraction grating, the input-coupler 712B is designed to diffract blue light within an input angular range (e.g., +/−15 degrees relative to the normal) and within the blue wavelength range (e.g., from 430 nm to 480 nm) into the waveguide 702B, such that an angle of the diffractively in-coupled blue light exceeds the critical angle for the waveguide 702B and can thereby travel by way of TIR from the input-coupler 712B to the output-coupler 716B. Further, the input-coupler 712B is designed to transmit light outside the blue wavelength range, so that light outside the blue wavelength range (such as light within the green and red wavelength ranges) will pass through the waveguide 702B. However, note that for the waveguide stack of FIG. 7A there may be some of amount of cross-coupling between the waveguides.

When implemented as an input diffraction grating, the input-coupler 112G is designed to diffract green light within an input angular range (e.g., +/−15 degrees relative to the normal) and within the green wavelength range (e.g., from 500 nm to 550 nm) into the waveguide 102G, such that an angle of the diffractively in-coupled green light exceeds the critical angle for the waveguide 102G and can thereby travel by way of TIR from the input-coupler 112G to the output-coupler 116G. Further, the input-coupler 112G is designed to transmit light outside the green wavelength range, so that light outside the green wavelength range (such as light within the red wavelength range) will pass through the waveguide 102G.

When implemented as an input diffraction grating, the input-coupler 112R is designed to diffract red light within an input angular range (e.g., +/−15 degrees relative to the normal) and within the red wavelength range (e.g., from 600 nm to 650 nm) into the waveguide 102R, such that an angle of the diffractively in-coupled red light exceeds the critical angle for the waveguide 102R and can thereby travel by way of TIR from the input-coupler 112R to the output-coupler 116R. Further, the input-coupler 112R is designed to transmit light outside the red wavelength range, so that light outside the red wavelength range will pass through the waveguide 102R.

More generally, each of the waveguides can include an input-coupler 712 that is configured to couple-in light within an input angular range (e.g., +/−15 degrees relative to the normal) and within a specific wavelength range into the waveguide, such that an angle of the in-coupled light exceeds the critical angle for the waveguide and can thereby travel by way of TIR from the input-coupler 712 to the output-coupler 716 of the waveguide, and such that light outside the specific wavelength range is transmitted and passes through the waveguide 102.

Referring still to FIG. 7A, the solid thick arrowed lines shown within the waveguide 702B are representative of blue light traveling by way of TIR from the input-coupler 712B to the output-coupler 716B. The dashed thick arrowed lines shown within the waveguide 702G are representative of green light traveling by way of TIR from the input-coupler 712G to the output-coupler 716G. The dotted thick arrowed lines shown within the waveguide 702R are representative of red light traveling by way of TIR from the input-coupler 712R to the output-coupler 716R.

In FIG. 7A the solid thick arrowed lines directed from the output-coupler 716B of the waveguide 702B toward the human eye 214 at a first angle (zero degrees relative to the normal, in this example) are representative of blue light that is purposefully out-coupled by the output-coupler 716B of the waveguide 702B for viewing by the human eye 214.

In FIG. 7A the dashed thick arrowed lines directed from the output-coupler 716G of the waveguide 702G toward the human eye 214 at a first angle (zero degrees relative to the normal, in this example) are representative of green light that is purposefully out-coupled by the output-coupler 716G of the waveguide 702G for viewing by the human eye 214.

In FIG. 7A the dotted thick arrowed lines directed from the output-coupler 716R of the waveguide 702R toward the human eye 214 at a first angle (zero degrees relative to the normal, in this example) are representative of red light that is purposefully out-coupled by the output-coupler 716R of the waveguide 702R for viewing by the human eye 214.

In FIG. 7A, the main waveguide 102a was shown and described as including the waveguide 702R for guiding red light within a red wavelength range, the waveguide 702G for guiding green light within a green wavelength range, and the waveguide 702B for guiding blue light within a blue wavelength range. In alternative embodiments, a first waveguide may guide both blue and green light, while a second waveguide guides the red light. In such an embodiment, an input-coupler would be configured to couple both blue and green light into a waveguide, and an output-coupler would be configured to couple both blue and green light out of the waveguide. This is just an example, as other variations are also possible and within the scope of the embodiments of the present technology.

The peripheral optical waveguide 102b may also comprise a stack of waveguides. FIG. 7B is a diagram showing further details of one embodiment in which the peripheral waveguide 102b comprises a stack of waveguides. The peripheral waveguide 102b is shown as including three waveguides labeled 702R, 702G, 702B (each of which can be similar to the waveguide 102b introduced with reference to FIGS. 1A, 1B, and 1C) and a peripheral light engine 104b that generates an image including angular content that is coupled into the waveguides 702R, 702G, 702B by the input-couplers 712R, 712G and 712B. Also depicted are an image former 206 and a collimating lens 208.

FIG. 7B will not be described in detail as much of the operation is similar to that described with respect to the main waveguide 102a of FIG. 7A. A difference between FIGS. 7A and 7B is the angle of incidence of the light rays from the peripheral light engine 104b. In FIG. 7B, the angle of incidence is quite large, as discussed already with respect to examples in FIGS. 1A, 1B, and 3B, for example. Also, diffraction gratings of both the input and output couplers may have different characteristics from the main waveguide 102a, given the different central angle of incidence, as well as a potentially larger range of angles of incidence.

Each of the input-couplers 712 in the embodiment of FIG. 7B have an input angular range, and each of the output-coupler 716 have an output angular range. However, these angular ranges could be larger than those of the main waveguide 102a of FIG. 7A. In accordance with certain embodiments, all of the input-couplers 712 in the embodiment of FIG. 7B have substantially the same input angular range, and all of the output-couplers 716 have substantially the same output angular range. In accordance with certain embodiments, the input angular range for the input-couplers 712 is substantially the same as the output angular range for the output-couplers 716. Values are considered to be substantially the same if they are within 5% of one another. In accordance with certain embodiments, the input angular range and the output angular range are each approximately +/−30 degrees relative to the central angle. Smaller or larger input and output angular ranges are also possible, and within the scope of embodiments described herein.

As mentioned in the discussion of FIG. 7A, an example input angular range for the input-couplers 712 of the main waveguide 102a is +/−15 degrees relative to the normal. Note that another way to state this is that the input angular range for the input-couplers 712 of the main waveguide 102a is +/−15 degrees relative to the central angle of incidence.

An example input angular range for the input-couplers 712 of the peripheral waveguide 102b is +/−30 degrees relative to the central angle of incidence. However, the input angular range for the peripheral waveguide 102b could be larger or smaller. Note that the angle of the in-coupled light should exceed the critical angle for the waveguide and can thereby travel by way of TIR from the input-coupler 712 to the output-coupler 716 of the waveguide, and such that light outside the specific wavelength range is transmitted and passes through the waveguide. However, note that for the waveguide stack of FIG. 7B there may be some of amount of cross-coupling between the waveguides.

As already discussed with respect to FIG. 7A, the arrowed lines directed from the output-couplers 716 of the waveguides 702 toward the human eye 214 have an angle of zero degrees relative to the normal, in that example. In FIG. 7B, the arrowed lines directed from the output-couplers 716 of the waveguides 702 toward the human eye 214 have an angle of substantially more than degrees relative to normal, in this example.

Figure 8A:
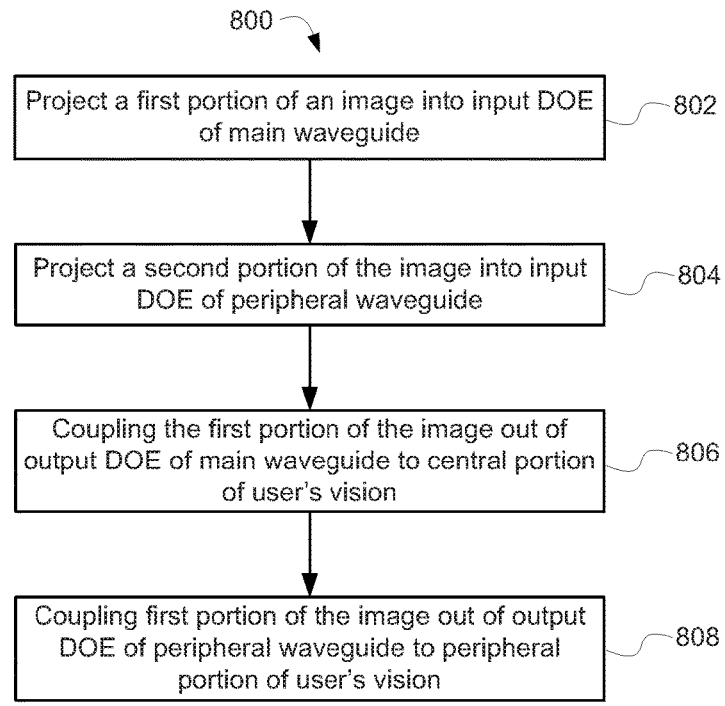
FIG. 8A is a high level flow diagram that is used to summarize methods according to embodiments of the present technology.

The high level flow diagram of FIG. 8A will now be used to summarize methods according to certain embodiments of the present technology. The methods described with reference to FIG. 8A utilize an optical waveguide to replicate an image associated with an input-pupil to an output-pupil. The process 800 of FIG. 8A may be used with, but is not limited to, various embodiments depicted in FIGS. 1A, 1B, 1C, 2A, 2B, 2C, 3A, 3B, 5, 6, 7A, and/or 7B.

Referring to FIG. 8A, step 802 includes projecting a first portion of an image from a main light engine 104a into a diffractive optical element (DOE) of a main waveguide 102a. Step 804 includes projecting a second portion of the image from a peripheral light engine 104b into a diffractive optical element (DOE) of a peripheral waveguide 102b.

Figure 8B:
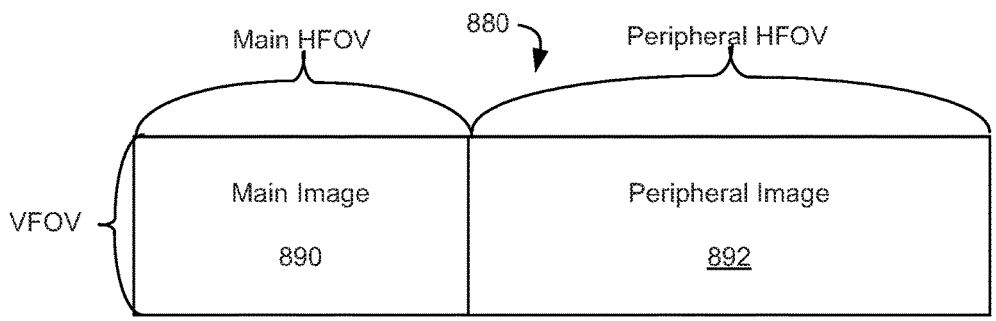
FIG. 8B is a diagram that represents one possible image for steps 802-804 of the process of FIG. 8A.

FIG. 8B is a diagram that represents one possible image 880 from steps 802-804. The image 880 has first portion labelled as "main image" 890 and a second portion labelled as "peripheral image" 892. The main image 890 has a main horizontal field of view (HFOV). The peripheral image 890 has a peripheral HFOV. The peripheral HFOV is larger than the main HFOV, in some embodiments. For example, the main HFOV may be about 25 degrees, whereas the peripheral HFOV may be about 50 degrees. These numbers are just examples—each HFOV could be larger or smaller. Adding the peripheral HFOV to the main HFOV substantially increases both the total HFOV, as well as the total diagonal FOV.

In the example of FIG. 8B, the vertical field of view (VFOV) is the same for the main image 890 and the peripheral image 892. However, the main image 890 and the peripheral image 892 could have different VFOVs. In this example, the VFOV is not being expanded. However, in an alternative embodiment, the VFOV is expanded instead of expanding the HVOF.

In one embodiments, the main image 890 and the peripheral image 892 have different resolutions. In one embodiment, the main image 890 has a higher resolution than the peripheral image 892.

Step 806 includes coupling the first portion of the image out of an output coupler of the main waveguide 102a to a central portion of a user's vision. The central portion of the user's vision is not intended to be limited to any specific range of angles.

Step 808 includes coupling the second portion of the image out of an output coupler of the peripheral waveguide 102b to a peripheral portion of a user's vision. The peripheral portion of the user's vision is not intended to be limited to any specific range of angles. The range of angles need not include the entire peripheral portion of the user's vision.

As noted above, in the discussion of FIGS. 1A, 1B, 1C, 2A, 2B, 2C in certain embodiments the input-coupler 112, the intermediate-component 114 (when present) and the output-coupler 116 can all be implemented as SRGs. Such SRGs can all be located in or on the same one of the major planar surfaces 108 or 110 of the bulk-substrate 106 of the waveguide 102. Alternatively, it is also possible that at least one of the input-coupler 112, the intermediate-component 114 or the output-coupler 116 is an SRG formed in or on one of the major planar surfaces (e.g., 108) of the bulk-substrate 106, while at least one other one of the input-coupler 112, the intermediate-component 114 or the output-coupler 116 is an SRG formed in or on the other one of the major planar surfaces (e.g., 110) of the bulk-substrate 106.

Figure 9A:
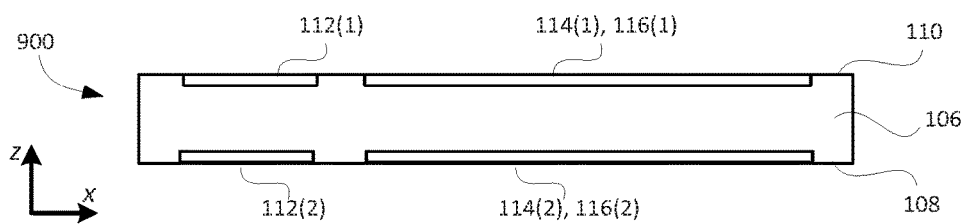
FIGS. 9A and 9B are, respectively, top and side views of a waveguide that includes double-side diffractive optical elements (DOEs).
Figure 9B:
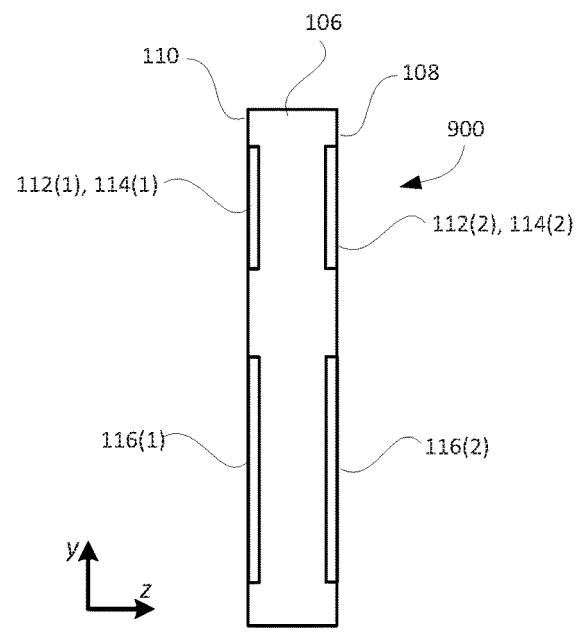

In certain embodiments of the present technology, which will now be discussed with reference to FIGS. 9A and 9B, any one, two or all of an input-coupler 112, an intermediate-component 114 or an output-coupler 116 can be implemented as a double-sided SRG, or more generally, as a double-sided DOE. FIGS. 9A and 9B are, respectively, top and side views of a waveguide 900 wherein each the input-coupler, the intermediate-component and the output-coupler are implemented as double-sided DOEs. The front view of the waveguide 900 can look, e.g., the same as or similar to the front view of the waveguide 102 shown in FIG. 2B. Such a front view of the waveguide 900 is not included, since the front view would not show how the input-coupler, the intermediate-component and the output-coupler are implemented as double-sided DOEs, because DOEs on one of the planar major surfaces 108 or 110 of the bulk-substrate 106 would completely overlap the DOEs on the other one of the planar major surfaces.

Referring to FIGS. 9A and 9B, where the input-coupler is a double-sided DOE, the input-coupler includes a DOE 112(1) on the major planar surface 110 as well as a DOE 112(2) on the other major planar surface 108. Accordingly, such an input-coupler can be referenced as the input-coupler 112(1)/(2). Where the intermediate-component is a double-sided DOE, the intermediate-component includes a DOE 114(1) on the major planar surface 110 as well as a DOE 114(2) on the other major planar surface 108, and thus, can be referenced as the intermediate-component 114(1)/(2). Similarly, where the output-coupler is a double-sided DOE, the output-coupler includes a DOE 116(1) on the major planar surface 110 as well as a DOE 116(2) on the other major planar surface 108, and thus, can be referenced as the output-coupler 116(1)/(2). The input-coupler 112(1)/(2), the intermediate-component 114(1)/(2) and the output-coupler 116(1)/(2) can be collectively referenced as double-sided DOE components 112(1)/(2), 114(1)/(2) and 116(1)/(2).

In accordance with certain embodiments, the grating period and orientation of each DOE, of a pair of DOEs associated with one of the components 112(1)/(2), 114(1)/(2) or 116(1)/(2), are precisely matched so as to not adversely affect the modulation transfer function (MTF) of the imaging system and/or produce double imaging. For example, for the component 112(1)/(2), the grating period and orientation of the DOE 112(1) are precisely matched to (i.e., the same as) the grating period and orientation of the DOE 112(2). Similarly, for the component 114(1)/(2), the grating period and orientation of the DOE 114(1) are precisely matched to the grating period and orientation of the DOE 114(2); and for the component 116(1)/(2), the grating period and orientation of the DOE 116(1) are precisely matched to the grating period and orientation of the DOE 116(2).

In accordance with certain embodiments, included in an opposing pair DOEs, associated with one of the components 112(1)/(2) and 116(1)/(2), is both a transmission grating and a reflective grating. For example, for the component 112(1)/(2), the DOE 112(1) can be a transmissive grating and the DOE 112(2) can be reflective grating. For another example, for the component 116(1)/(2), the DOE 116(1) can be a reflective grating, and the DOE 116(2) can be a transmissive grating. Other variations are also possible, and are within embodiments of the present technology. Where the intermediate-component is a double-sided DOE, both DOEs should be reflective gratings, because the intermediate-component is not intended to couple light out of the waveguide. In other words, for the component 114(1)/(2), the DOE 114(1) and the DOE 114(2) should both be reflective gratings.

For a single-sided DOE waveguide, polarization and phase changes are only introduced in light propagating through the bulk-substrate (e.g., 106) when they interact with the DOE. With the double-sided DOE orientation, where DOEs are included in or on both major planar sides 108 and 110 of the bulk-substrate 106, twice the number of diffractive interactions are induced, wherein each interaction with a DOE induces phase and polarization changes. More specifically, the use of double-sided DOEs will increase the phase diversity of the wave fronts of light traveling within the waveguide, since light that is not diffracted by a first DOE (of a pair) but is diffracted by a second DOE (of the pair) will have traveled a greater path length (having traveled through the thickness of the bulk-substrate 106) before being incident on the second DOE (of the pair). Further, where every diffraction and/or reflection from a DOE causes a polarization rotation, the inclusion of DOEs in or on both major planar sides 108 and 110 of the bulk-substrate 106 will induce twice the number of polarization rotations, which will provide for a heterogeneous polarization distribution. Accordingly, the inclusion of double-sided DOEs can be used to compensate for multiple-loop interference caused by the intermediate-component 114 (if one is present), provide for a heterogeneous polarity distribution of the light that is incident on the output-coupler 116 (after having traveled through the waveguide 102), and provide for a substantially uniform pupil distribution, and thereby, such embodiments can be used to provide a substantially uniform intensity distribution in the light that has exited the waveguide 102 at the output-coupler 116.

Another one of the benefits of the double-side DOEs is that they should provide for a better system efficiency compared to a single-sided DOE system, because at least a portion of any light that is not diffracted by the first one of the pair of DOEs, upon which the light is first incident, will likely be diffracted by the second one of the pair of DOEs.

The DOEs included in or on one of the major planar surfaces 108 or 110 can be etched into one of the major planar surfaces 108 or 110 of the bulk-substrate 106, in which case each such DOE can be said to be formed "in" the bulk-substrate 106. Alternatively, each DOE (e.g., which can be an SRG) can be physically formed in a coating that covers one of the major planar surfaces 108 or 110 of the bulk-substrate 106, in which case each such DOE can be said to be formed "on" the bulk-substrate 106. Such a coating can be isotropic, or alternatively, can be an LCP coating that is anisotropic, the benefits of which were discussed above. For example, for each double-sided DOE, one or both of the DOEs can be an LCP based SRG.

The DOEs formed in or on one of the major planar surface 108 or 110 can be formed in the same, or in a different manner, than the DOEs formed in or on the other one of the major planar surfaces 108. Either way, the components 112(1)/(2), 114(1)/(2) and 116(1)/(2) are considered parts of the waveguide 900.

In certain embodiments, where the components 112(1), 114(1) and 116(1) are DOEs that are formed in a coating covering the major planar surface 110, and the components 112(2), 114(2) and 116(2) are DOEs that are formed in a coating covering the other major planar surface 108, the coatings covering the opposing major planar surfaces 110 and 108 can be of the same or different types of coating materials, and can be of the same or different thicknesses.

Each of an input-coupler, an intermediate-component and an output-coupler of a waveguide can be implemented as a double-side DOE. Alternatively, one or more of an input-coupler, an intermediate-component or an output-coupler of a waveguide can be implemented as a double-side DOE, while other one(s) of the components are not. It is also possible that one or more of an input-coupler or an output-coupler be implemented as a double-side DOE, and that the waveguide not include an intermediate-component at all.

Numerous modifications to the embodiments described herein are possible. For example, some embodiments described herein provide for a large horizontal FOV, wherein the main and peripheral waveguides may cover different portions of a horizontal FOV. A large vertical FOV can also be provided by suitable modifications to the optical waveguide assembly, wherein the main and peripheral waveguides may cover different portions of a vertical FOV. Other modifications are possible, as well.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a first optical waveguide having a first input diffractive coupler and a first output coupler;
   a second optical waveguide having a second input diffractive coupler and a second output coupler, wherein the second optical waveguide is angled with respect to the first optical waveguide;
   a first light engine configured to project a first light into the first input diffractive coupler at a first central angle of incidence, the first output coupler configured to project the first light out of the first optical waveguide; and
   a second light engine configured to project a second light into the second input diffractive coupler at a second central angle of incidence that is greater than the first central angle of incidence, the second output coupler configured to project the second light out of the second optical waveguide to intersect with the first light projected out of the first optical waveguide,
   wherein the first optical waveguide and the second optical waveguide are configured to respectively provide the first projected light and the second projected light to a common eye of a user.

2. The apparatus of claim 1, wherein the first light engine is configured to project a first portion of an image into the first input diffractive coupler, the first portion of the image having a first field of view, and wherein the second light engine is configured to project a second portion of the image into the second input diffractive coupler, the second portion of the image having a second field of view that is greater than the first field of view.

3. The apparatus of claim 2, wherein the first portion of the image has a first resolution, and wherein the second portion of the image has a second resolution that is lower than the first resolution.

4. The apparatus of claim 1, wherein the second optical waveguide comprises a major surface that is planar, and wherein the second light engine is configured to project the light into the planar major surface.

5. The apparatus of claim 4, wherein the first optical waveguide comprises a major surface that is planar, wherein the first light engine is configured to project the light into the planar major surface of the first optical waveguide, and wherein an angle between the planar major surface of the first optical waveguide and the planar major surface of the second optical waveguide is between approximately 30 degrees and 90 degrees.

6. The apparatus of claim 1, wherein the second optical waveguide comprises a major surface that is curved, and wherein the second light engine is configured to project the light into the curved major surface.

7. The apparatus of claim 6, wherein the first optical waveguide comprises a major surface that is curved.

8. The apparatus of claim 6, wherein the first optical waveguide comprises a major surface that is planar.

9. The apparatus of claim 1, wherein the second central angle of incidence is between 30 degrees and 60 degrees, and wherein the first central angle of incidence is approximately zero degrees.

10. The apparatus of claim 1, wherein the second output coupler is a diffractive coupler, and further comprising a diffractive optical element between the second input diffractive coupler and the second output coupler.

11. The apparatus of claim 1, wherein the first output coupler is configured to project the light to a central vision of user wearing the apparatus, and wherein the second output coupler is configured to project the light to a peripheral vision of the user wearing the apparatus.

12. A method of operating a head mounted display, the method comprising:
    coupling a first portion of an image into a first input diffractive coupler of a first optical waveguide of the head mounted display at a first central angle of incidence;
    coupling a second portion of the image into a second input diffractive coupler of a second optical waveguide of the head mounted display at a second central angle of incidence that is greater than the first central angle of incidence, the second input diffractive coupler being angled with respect to the first input diffractive coupler;
    coupling the first portion of the image out of a first output coupler of the first optical waveguide to a central portion of a user's vision for a common eye of the user; and
    coupling the second portion of the image out of a second output coupler of the second optical waveguide to a peripheral portion of the user's vision for the common eye of the user.

13. The method of claim 12, wherein coupling the first portion of the image into the first input diffractive coupler comprises coupling a portion of the image that comprises a first horizontal field of view, and wherein coupling the second portion of the image into the second input diffractive coupler comprises coupling a portion of the image that comprises a second horizontal field of view that is greater than the first horizontal field of view.

14. The method of claim 13, wherein coupling the first portion of the image into the first input diffractive coupler comprises coupling a portion of the image that comprises a first resolution, and wherein coupling the second portion of the image into the second input diffractive coupler comprises coupling a portion of the image that comprises a second resolution that is less than the first resolution.

15. The method of claim 12, wherein the second central angle of incidence is between 30 degrees and 60 degrees, and wherein the first central angle of incidence is approximately zero degrees.

16. A see-through, near eye display system, comprising:
a first optical waveguide including a first bulk substrate, a first diffractive optical element and a second diffractive optical element;
a first light engine configured to scan a first portion of an image into the first diffractive optical element at a central angle of incidence that is approximately zero degrees, wherein the first optical waveguide is configured to transmit the first portion of the image by total internal reflection through the first bulk substrate, and wherein the second diffractive optical element is configured to deliver the first portion of the image to a central vision of a common eye of a wearer of the see-through, near eye display system;
a second optical waveguide including a second bulk substrate, a third diffractive optical element and a fourth diffractive optical element, wherein the second optical waveguide is angled with respect to the first optical waveguide;
a second light engine configured to scan a second portion of the image into the third diffractive optical element at a second central angle of incidence that is at least 30 degrees, the second optical waveguide configured to transmit the second portion of the image by total internal reflection through the second bulk substrate, the fourth diffractive optical element configured to deliver the second portion of the image to a peripheral vision of the common eye of the wearer of the see-through, near eye display system.

17. The see-through, near eye display system of claim 16, wherein the first portion of the image has a first horizontal field of view, and wherein the second portion of the image having a second horizontal field of view that is greater than the first horizontal field of view.

18. The see-through, near eye display system of claim 17, wherein first portion of the image has a first resolution, and wherein the second portion of the image has a second resolution that is lower than the first resolution.

19. The see-through, near eye display system of claim 17, wherein the second optical waveguide comprises a major surface that is curved, the second light engine being configured to scan the second portion of the image into the curved major surface.

20. The see-through, near eye display system of claim 17, wherein the first optical waveguide comprises a first major surface that is planar, wherein the first light engine is configured to scan the first portion of the image into the first planar major surface, wherein the second optical waveguide comprises a second major surface that is planar, and wherein the second light engine is configured to scan the second portion of the image into the second planar major surface, and wherein an angle between the first planar major surface and the second planar major surface is between approximately 30 degrees and 90 degrees.

21. The apparatus of claim 1, wherein a field of view covered by the first light and the second light ranges from about −15 degrees to about 85 degrees.

22. The apparatus of claim 1, wherein the second optical waveguide is positioned adjacent to, and extends away from, an end of the first optical waveguide.

* * * * *